(12) United States Patent
Lee et al.

(10) Patent No.: US 11,606,501 B2
(45) Date of Patent: *Mar. 14, 2023

(54) ELECTRONIC DEVICE AND IMAGE CONTROL METHOD OF THE ELECTRONIC DEVICE

(71) Applicant: Samsung Electronics Co., Ltd., Suwon-si (KR)

(72) Inventors: Jaehan Lee, Suwon-si (KR); Jiyeon Kim, Suwon-si (KR); Woojin Jung, Suwon-si (KR); Nari Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,475

(22) Filed: Oct. 25, 2021

(65) Prior Publication Data
US 2022/0046172 A1 Feb. 10, 2022

Related U.S. Application Data

(63) Continuation of application No. 16/790,232, filed on Feb. 13, 2020, now Pat. No. 11,159,721.

(30) Foreign Application Priority Data

Feb. 19, 2019 (KR) .......................... 10-2019-0019401

(51) Int. Cl.
*H04N 5/232* (2006.01)
*G06F 3/01* (2006.01)
(Continued)

(52) U.S. Cl.
CPC ......... *H04N 5/23245* (2013.01); *G06F 3/016* (2013.01); *H04N 5/23296* (2013.01); *H04N 5/232933* (2018.08)

(58) Field of Classification Search
CPC ...................... H04N 5/23245; H04N 5/23296
See application file for complete search history.

(56) References Cited

U.S. PATENT DOCUMENTS 9,716,825 B1 7/2017 Manzari et al.
11,159,721 B2 * 10/2021 Lee ..................... G06F 3/04845
(Continued)

FOREIGN PATENT DOCUMENTS

KR 10-2013-0027774 A 3/2013
KR 10-2017-0002816 A 1/2017

*Primary Examiner* — Christopher K Peterson
(74) *Attorney, Agent, or Firm* — Jefferson IP Law, LLP

(57) ABSTRACT

An electronic device is provided. The electronic device includes a camera including a plurality of lenses, a display, and a processor, in which the processor is configured to display a plurality of icons corresponding to the plurality of lenses, based on first position information in a first photographing mode, and upon selection of a first icon by a first gesture from the plurality of icons in the first photographing mode, switch to a second photographing mode and display a zoom control region including a plurality of zoom levels having a first zoom level of a first lens corresponding to the first icon as a reference zoom level and the plurality of icons rearranged based on second position information corresponding to the plurality of zoom levels.

18 Claims, 44 Drawing Sheets

(51) Int. Cl.
*G06F 3/04845* (2022.01)
*G06F 3/04847* (2022.01)
*G06F 1/16* (2006.01)
*G03B 5/00* (2021.01)

(56) References Cited

U.S. PATENT DOCUMENTS

| | | |
|---|---|---|
| 2013/0063380 A1 | 3/2013 | Wang et al. |
| 2018/0069983 A1* | 3/2018 | Cho ........................ G06F 3/0481 |
| 2018/0146132 A1 | 5/2018 | Manzari et al. |
| 2019/0068893 A1 | 2/2019 | Kim |

* cited by examiner

ELECTRONIC DEVICE AND IMAGE CONTROL METHOD OF THE ELECTRONIC DEVICE

CROSS-REFERENCE TO RELATED APPLICATION(S)

This application is a continuation application of prior application Ser. No. 16/790,232, filed on Feb. 13, 2020, which has issued as U.S. Pat. No. 11,159,721 on Oct. 26, 2021, and was based on and claimed priority under 35 U.S.C. § 119(a) of a Korean patent application number 10-2019-0019401, filed on Feb. 19, 2019, in the Korean Intellectual Property Office, the disclosure of which is incorporated by reference herein in its entirety.

BACKGROUND

1. Field

The disclosure relates to an electronic device and an image control method of the electronic device.

2. Description of Related Art

Still image shooting or moving image shooting using an electronic device has increased, and a user may in advance check an image to be shot in a photographing mode that displays an image to be obtained through a camera, before still image shooting or moving image shooting. In the photographing mode, the user may perform various functions such as enlargement/reduction, brightness control, etc., with respect to the image.

In the photographing mode of the electronic device where the image to be obtained through the camera is displayed before still image shooting or moving image shooting, the image displayed in the photographing mode may be enlarged and reduced through manipulation of a pinch zoom-in/out or shooting button.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of conveniently providing an enlargement and reduction function with respect to an image in a photographing mode where an image is displayed before shooting, and an image control method of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a camera including a plurality of lenses, a display, and a processor, in which the processor is configured to display a plurality of icons corresponding to the plurality lenses, based on first position information in a first photographing mode, and upon selection of an icon by a first gesture from among the plurality of icons in the first photographing mode, to switch to a second photographing mode to display a zoom control region including a plurality of zoom levels having a zoom level of a lens corresponding to the selected icon as a reference zoom level and the plurality of icons rearranged in position based on second position information corresponding to the plurality of zoom levels.

In accordance with another aspect of the disclosure, an image control method of an electronic device is provided. The image control method includes displaying a plurality of icons corresponding to the plurality lenses, based on first position information in a first photographing mode and upon selection of an icon by a first gesture from among the plurality of icons in the first photographing mode, switching to a second photographing mode to display a zoom control region including a plurality of zoom levels having a zoom level of a lens corresponding to the selected icon as a reference zoom level and the plurality of icons rearranged in position based on second position information corresponding to the plurality of zoom levels.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
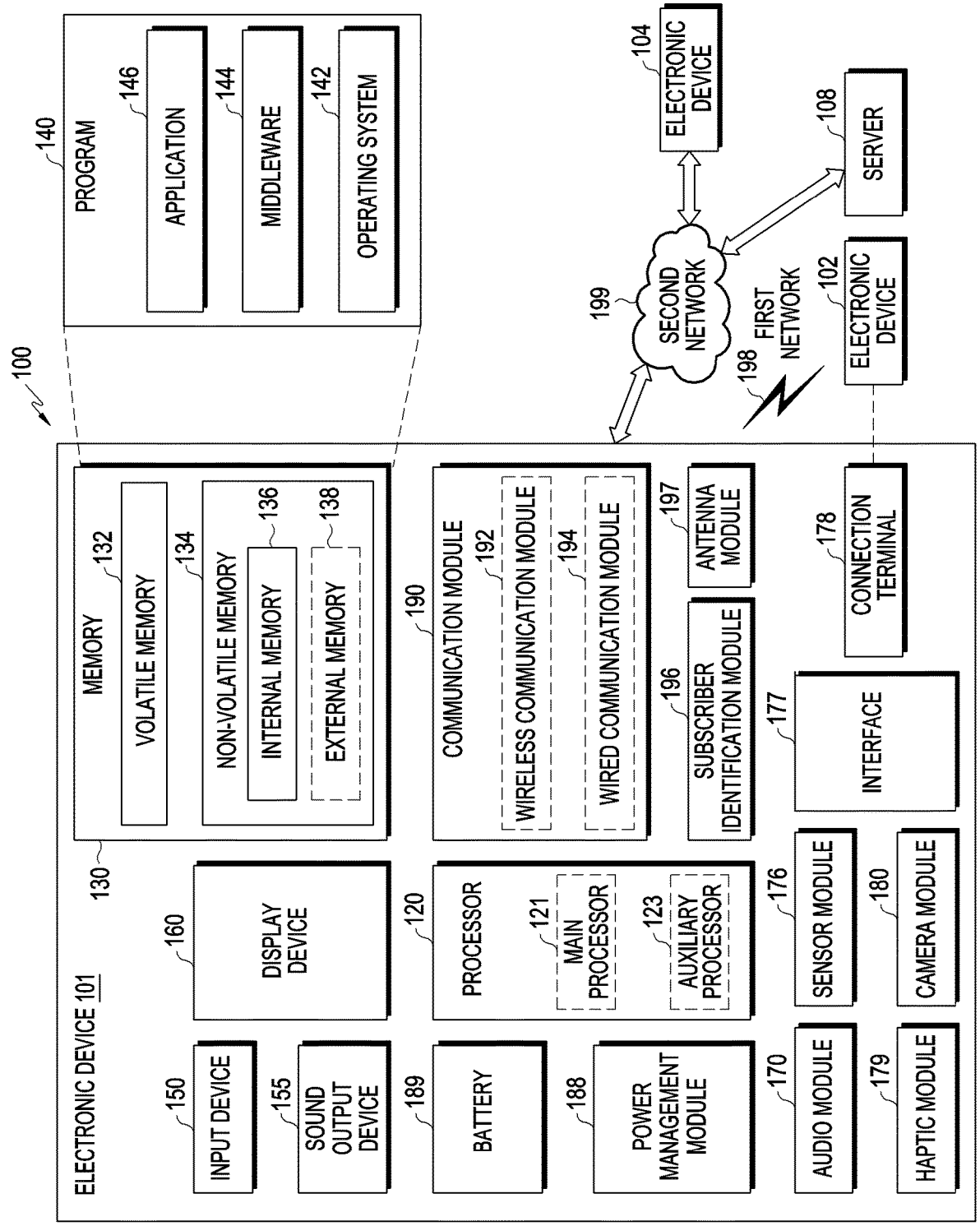
FIG. 1 is a block diagram of an electronic device in a network environment, according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or recording, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via a user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the AP) and supports a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
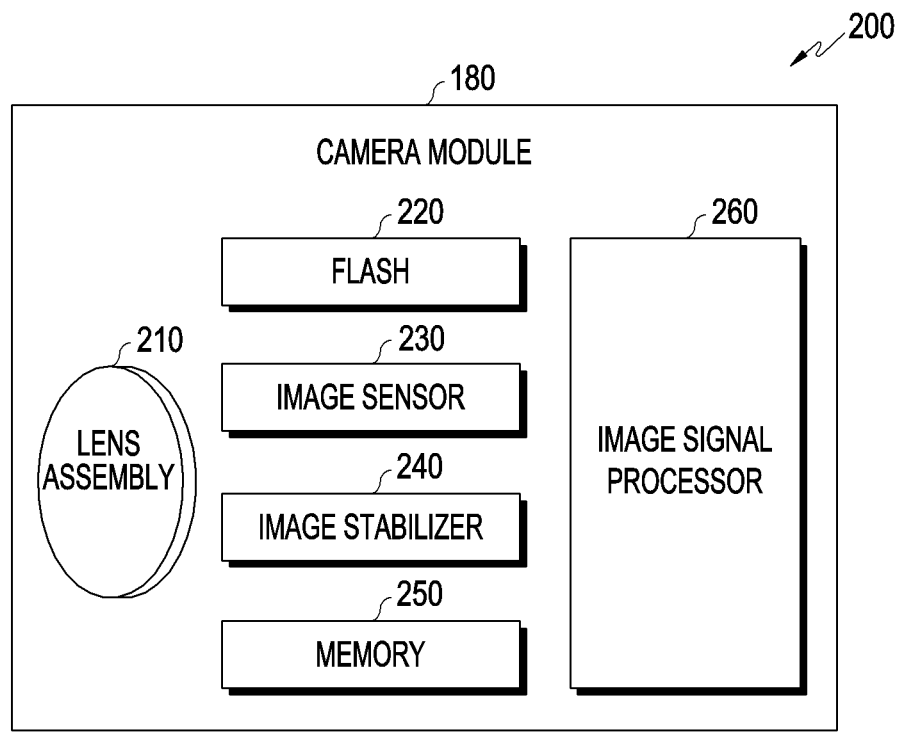
FIG. 2 is a block diagram of a camera module according to an embodiment of the disclosure.

FIG. 2 is a block diagram 200 of the camera module 180 according to an embodiment of the disclosure. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have at least one lens attributes different from those of another lens assembly. The lens assembly 210 may include, for example, a wide-angle lens or a telephoto lens. The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 180 or the electronic device 101 including the same upon a captured image in response to the movement. According to an embodiment, the image stabilizer 240 may be implemented with, for example, an optical image stabilizer, and may sense such a movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 360. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one another camera module may be a telescopic camera or a rear camera.

Figure 3:
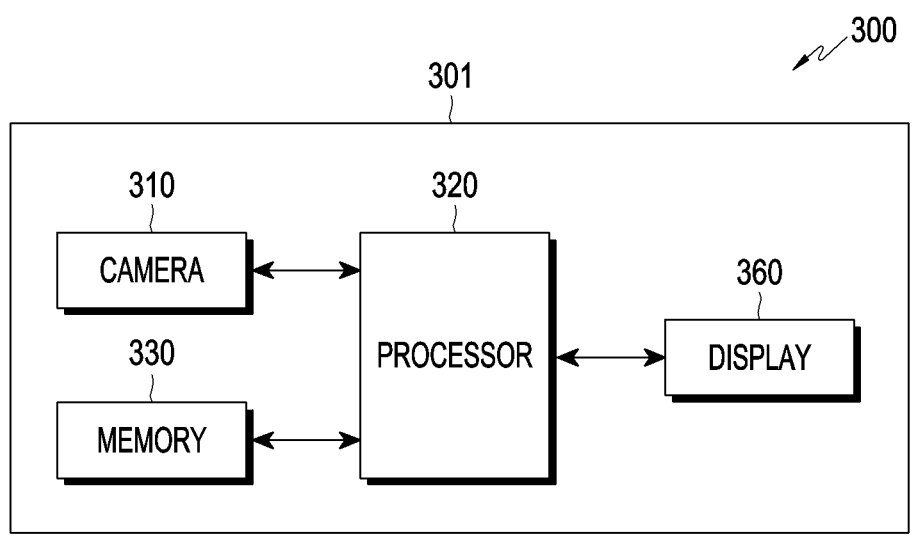
FIG. 3 is a schematic block diagram of an electronic device, according to an embodiment of the disclosure.

FIG. 3 is a schematic block diagram of an electronic device, according to an embodiment of the disclosure.

Referring to FIG. 3, a block diagram 300 of an electronic device 301 is illustrated. The electronic device 300 may be implemented substantially identically or similarly to the processor 120 of FIG. 1. For example, the electronic device 301 may be implemented with a smartphone or a tablet PC.

The electronic device 301 may include a camera 310, a processor 320, a memory 330, and a display 360.

The camera 310 may be implemented substantially identically or similarly to the camera module 180 of FIG. 1 or FIG. 2.

According to various embodiments, the camera 310 (e.g., the camera module 180 of FIGS. 1 and 2) may include a plurality of lenses (e.g., the plurality of lens assemblies 210 of FIG. 2) which have different zoom levels. For example, the plurality of lenses may include at least two of an ultra-wide lens, a standard lens, or a tele lens. The ultra-wide lens may include a zoom level having a magnification of ×0.5-×0.9, the standard lens may include a zoom level having a magnification of ×1.0-×2.0, and the tele lens may include a zoom level having a magnification of ×2.0 or higher.

The processor 320 may control overall operations of the electronic device 301. For example, the processor 320 may be implemented substantially identically or similarly to the processor 120 of FIG. 1.

According to various embodiments, the processor 320 may display a plurality of icons corresponding to a plurality of lenses included in the camera 310 based on first position information in a first photographing mode, obtain an image at a zoom magnification of a lens corresponding to an icon selected by a first gesture from among the plurality of icons, and display the obtained image on the display 360 (e.g., the display 160 of FIG. 1).

According to an embodiment, the first gesture may include various gestures including a tap.

According to an embodiment, the processor 320 may display the plurality of icons corresponding to the plurality of lenses in the first photographing mode for obtaining and displaying the image through the lens of the camera before performing photographing (e.g., still image shooting or moving image shooting).

According to an embodiment, the processor 320 may arrange and display the plurality of icons at equal intervals, based on the first position information in the first photographing mode. In the first photographing mode, the first position information for arranging the plurality of icons may be changed by a user.

According to an embodiment, upon selection of switchover to the first photographing mode (e.g., selection of an icon corresponding to a camera application), the processor 320 may display the plurality of icons while obtaining and displaying an image at a zoom magnification (e.g., ×1.0) of a lens set by default (e.g., a standard lens) among the plurality of lenses or at the zoom magnification (e.g., ×2.0) of a lens set in the previous first photographing mode.

According to an embodiment, the processor 320 may obtain and display an image at a zoom magnification of a lens corresponding to an icon selected by the first gesture from among the plurality of icons in the first photographing mode. While displaying the image obtained at the zoom magnification of the lens corresponding to the icon selected by the first gesture, the processor 320 may display the selected icon among the plurality of icons differently from the other icons.

According to an embodiment, the first photographing mode may indicate a photographing mode for still image shooting, moving image shooting, and selfie-shooting.

According to various embodiments, while displaying a plurality of icons corresponding to a plurality of lenses included in the camera 310 in the first photographing mode, upon selection of an icon from among the plurality of icons by a second gesture, the processor 320 switches from the first photographing mode to the second photographing mode and display, on the display 360 (e.g., the display 160 of FIG. 1), a zoom control region including a plurality of zoom levels and the plurality of icons rearranged in position based on second position information corresponding to the plurality of zoom levels.

According to an embodiment, the second gesture may include various gestures including a long tap and a left-right swipe. The second gesture may include a gesture that is identical to or different from the first gesture.

According to an embodiment, upon selection of a particular icon from among the plurality of icons by the second gesture after selection of the particular icon by the first gesture in the first photographing mode, the processor 320 may switch to the second photographing mode.

According to an embodiment, the processor 320 may display in the second photographing mode, the zoom control region including the plurality of zoom levels having a reference zoom level that is a zoom level of a lens corresponding to the icon selected by the first gesture in the first photographing mode. The processor 320 may set the zoom level of the lens selected in the first photographing mode to the reference zoom level of the plurality of zoom levels, before switching to the second photographing mode.

According to an embodiment, the processor 320 may display in the second photographing mode, the zoom control region including the plurality of zoom levels having a reference zoom level that is a zoom level of a lens corresponding to the icon selected by the second gesture.

According to an embodiment, the processor 320 may rearrange each of the plurality of icons in a position corresponding to a zoom level among the plurality of zoom levels in the second photographing mode. For example, the processor 320 may display each of the plurality of icons in an upper end or a lower end of a zoom bar indicating the plurality of zoom levels to prevent the plurality of zoom levels from being hidden by the plurality of icons.

According to an embodiment, upon switchover to the second photographing mode, the processor 320 may display the zoom control region while displaying an image obtained at a zoom level of the lens corresponding to the icon selected by the second gesture.

According to an embodiment, upon detection of a third gesture in the zoom control region in the second photographing mode, the processor 320 may obtain and display an image at a zoom level of a lens corresponding to a zoom level selected by the third gesture from among the plurality of zoom levels. While displaying the image obtained at the zoom level of the lens corresponding to the zoom level selected by the third gesture, the processor 320 may display the plurality of zoom levels having the reference zoom level changed to the zoom level selected by the third gesture.

According to an embodiment, the third gesture may include various gestures including a left-right swipe detected in the zoom control region and a tap with respect to an icon among the plurality of icons. The third gesture may include a gesture that is identical to or different from the first gesture or the second gesture.

According to an embodiment, the processor 320 may switch to the first photographing mode unless the third gesture for enlarging or reducing the image is detected before an elapse of a specific time in the second photographing mode.

According to an embodiment, the processor 320 may display the plurality of icons in the zoom control region in the second photographing mode by changing display intervals among the plurality of icons based on specifications (e.g., a focal distance) of each of the plurality of icons included in the camera.

According to an embodiment, the second photographing mode may indicate a photographing mode for still image shooting, moving image shooting, and selfie-shooting.

According to various embodiments, while displaying a plurality of icons corresponding to a plurality of lenses included in the camera 310 in the first photographing mode, upon detection of a fourth gesture on a screen of the display 360, the processor 320 switches from the first photographing mode to the second photographing mode and display, on the display 360 (e.g., the display 160 of FIG. 1), the zoom control region including the plurality of zoom levels and the plurality of icons rearranged in position based on the second position information corresponding to the plurality of zoom levels.

According to an embodiment, the fourth gesture may include various gestures including pinch zoom-in/out, and the fourth gesture may include a gesture that is identical to or different from the first through third gestures.

According to an embodiment, the processor 320 may obtain and display an image at a zoom level of a lens corresponding to a zoom level selected from among the plurality of zoom levels based on the fourth gesture detected on the screen of the display 360, in the second photographing mode.

The memory 330 may store data of the electronic device 301. For example, the memory 330 may be implemented substantially identically or similarly to the memory 130 of FIG. 1. For example, the memory 250 may be implemented with a non-volatile memory.

The display 360 may be implemented substantially identically or similarly to the display 160 of FIG. 1.

According to various embodiments, the display 360 may display the plurality of icons corresponding to the plurality of lenses, based on the first position information in the first photographing mode. The display 360 may display an image obtained at a zoom level of a lens corresponding to an icon selected by the first gesture from among the plurality of icons.

According to various embodiments, the display 360 may display a plurality of selectable zoom levels and a zoom control region including a plurality of icons rearranged in position based on the second position information corresponding to the plurality of zoom levels, in the second photographing mode. The display 360 may display an image obtained at a zoom level of a lens corresponding to a zoom level selected by the third gesture or the fourth gesture from among the plurality of zoom levels.

According to various embodiments, an electronic device (e.g., the electronic device 101 of FIG. 1 or the electronic device 301 of FIG. 3) may include a camera (e.g., the camera module 180 of FIGS. 1 and 2 or the camera 310 of FIG. 3) including a plurality of lenses, a display (e.g., the display 160 of FIG. 1 or the display 360 of FIG. 3), and a processor (e.g., the processor 120 of FIG. 1 or the processor 320 of FIG. 3), in which the processor is configured to display a plurality of icons corresponding to the plurality lenses, based on first position information in a first photographing mode, and upon selection of an icon by a first gesture from among the plurality of icons in the first photographing mode, switch to a second photographing mode to display a zoom control region including a plurality of zoom levels having a zoom level of a lens corresponding to the selected icon as a reference zoom level and the plurality of icons rearranged in position based on second position information corresponding to the plurality of zoom levels.

According to various embodiments, the processor may be configured to arrange and display the plurality of icons at specific intervals based on the first position information in the first photographing mode.

According to various embodiments, the processor may be configured to, upon selection of an icon by a second gesture from among the plurality of icons in the first photographing mode, display an image at a zoom level of a lens corresponding to the selected icon.

According to various embodiments, the processor may be configured to display the plurality of icons and to differently display the selected icon among the plurality of icons, while displaying an image at a zoom level of a lens corresponding to an icon selected by a second gesture from among the plurality of icons.

According to various embodiments, the processor may be configured to rearrange each of the plurality of icons in a position corresponding to a zoom level among the plurality of zoom levels based on the second position information in the second photographing mode.

According to various embodiments, the processor may be configured to display, in response to switchover to the second photographing mode, the zoom control region, while displaying an image at a zoom level of a lens corresponding to the reference zoom level.

According to various embodiments, the processor may be configured to, upon detection of a third gesture in the zoom control region, display an image at a zoom level of a lens corresponding to a zoom level selected by the third gesture from among the plurality of zoom levels.

According to various embodiments, the processor may be configured to change the zoom level selected by the third gesture to the reference zoom level among the plurality of levels.

According to various embodiments, the processor may be configured to switch to the first photographing mode when the third gesture is not detected in the zoom control region until an elapse of a specific time, while displaying the zoom control region in the second photographing mode.

According to various embodiments, the processor may be configured to switch to the second photographing mode to display the zoom control region upon detection of a fourth gesture on a screen of the display in the first photographing mode.

Figure 4:
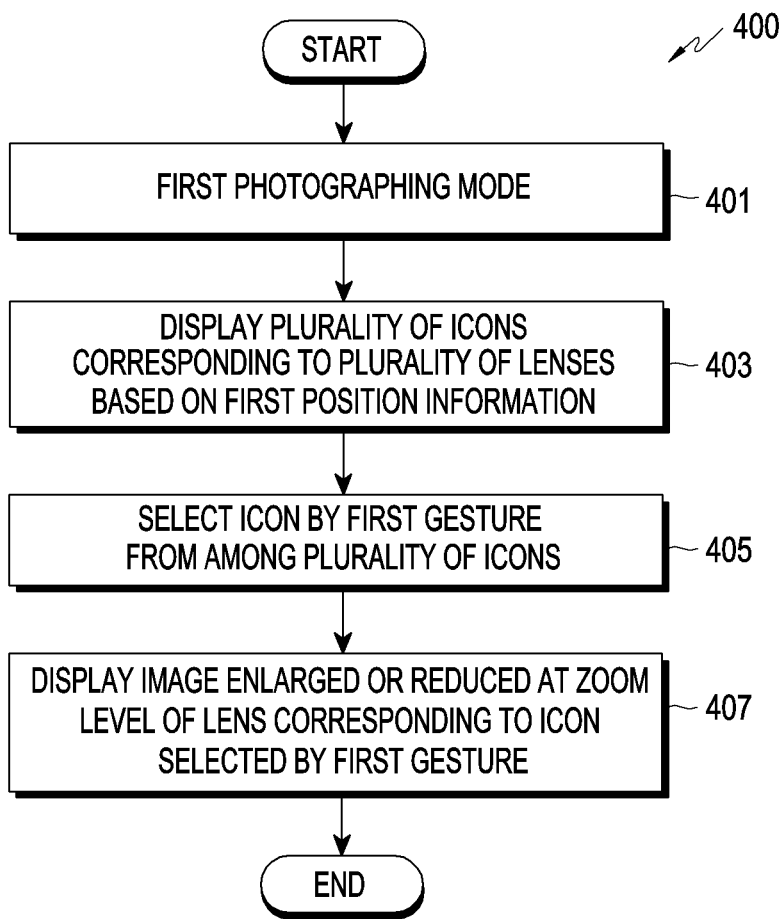
FIG. 4 is a flowchart for describing an operation of controlling an image in an electronic device, according to an embodiment of the disclosure.

FIG. 4 is a flowchart 400 for describing an operation of controlling an image in an electronic device, according to an embodiment of the disclosure. An image control method may include operations 401 through 407. The image control method may be performed by at least one of an electronic device (e.g., 101 of FIG. 1 or 301 of FIG. 3) or at least one processor (e.g., the processor 120 of FIG. 1 or 320 of FIG. 3).

Referring to FIG. 4, in operation 401, the processor (e.g., the processor 120 of FIG. 1 or the processor 320 of FIG. 3) may switch to a first photographing mode in response to selection of an icon corresponding to a camera application.

In operation 403, in response to switchover to the first photographing mode, the processor (e.g., the processor 120 of FIG. 1 or the processor 320 of FIG. 1) may display a plurality of icons corresponding to a plurality of lenses included in a camera (e.g., the camera module 180 of FIGS. 1 and 2 or the camera 310 of FIG. 3) on a display (the display 160 of FIG. 1 or the display 360 of FIG. 3) based on first position information. The first position information is information for displaying the plurality of icons in the first photographing mode, and based on the first position information, the plurality of icons may be displayed arranged at equal intervals.

In operation 405, the processor (e.g., the processor 120 of FIG. 1 or the processor 320 of FIG. 3) may detect selection of an icon by a first gesture (e.g., a tap or a swipe) from among the plurality of icons displayed based on the first position information in the first photographing mode.

In operation 407, the processor (e.g., the processor 120 of FIG. 1 or the processor 320 of FIG. 1) may select a lens corresponding to the icon selected by the first gesture among a plurality of lenses included in a camera (e.g., the camera module 180 of FIGS. 1 and 2 or the camera 310 of FIG. 3) and obtain and display an image enlarged or reduced at a zoom level of the lens.

Figure 5A:
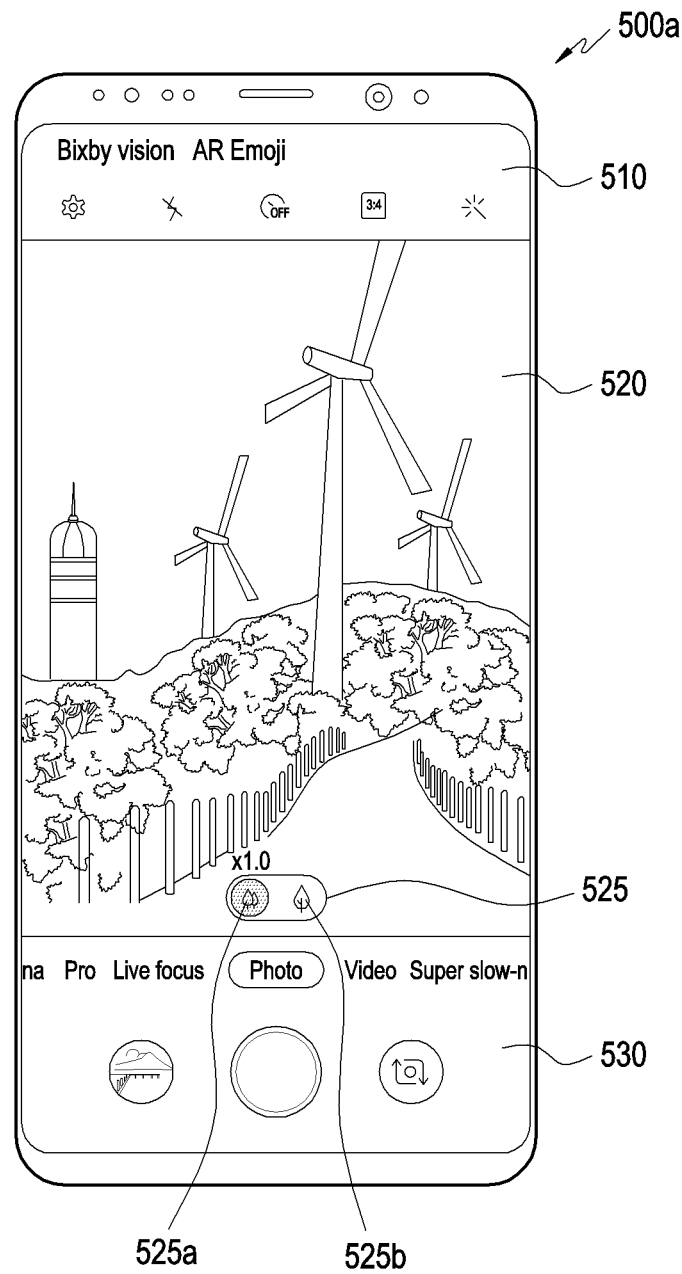
FIGS. 5A and 5B are views for describing an operation of controlling an image in an electronic device, according to various embodiments of the disclosure.
Figure 5B:
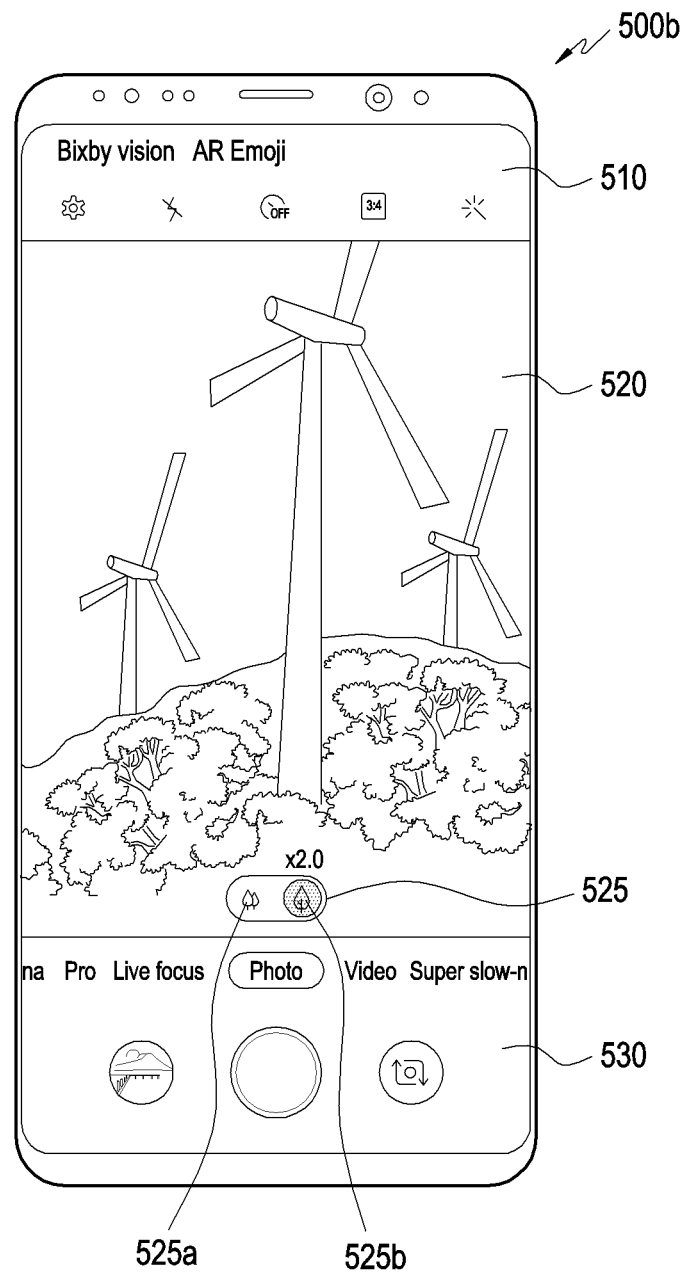

FIGS. 5A and 5B are views 500a and 500b for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 5A, upon switchover to a first photographing mode in response to selection of the icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 510 through 530 to display icons indicating various functions to be performed with respect to images obtained in the first photographing mode, on the first screen 510, and icons indicating various shooting functions and an icon indicating a shooting button on the third screen 530. The processor may display an image obtained through a camera (e.g., the camera module 180 of FIGS. 1 and 2 or the camera 310 of FIG. 3) on the second screen 520, and display a first icon 525a corresponding to a first lens (e.g., a standard lens) included in the camera and a second icon 525b corresponding to a second lens (e.g., a tele lens) included in the camera, for example, at equal intervals, based the first position information, in a specific region 525 of the second screen 520. Referring to FIG. 5A, upon selection of the first icon 525a between the two icons 525a and 525b corresponding to the two lenses by the first gesture (e.g., a tap), the processor may display an image received at a zoom level (e.g., a magnification of ×1.0) of the first lens (e.g., a standard lens) corresponding to the first icon 525a on the second screen 520. While displaying the image received at the zoom level (e.g., ×1.0) of the first lens (e.g., the standard lens) corresponding to the first icon 525a on the second screen 520, the processor may differently display the first icon 525a selected by the first gesture between the two icons 525a and 525b displayed in the specific region 525.

Referring to FIG. 5B, upon selection of the second icon 525b between the two icons 525a and 525b corresponding to the two lenses by the first gesture (e.g., a tap), the processor may display an image received at a zoom level (e.g., a magnification of ×2.0) of the second lens (e.g., a tele lens) corresponding to the second icon 525b on the second screen 520. While displaying the image received at the zoom level (e.g., ×2.0) of the second lens (e.g., the tele lens) corresponding to the second icon 525b on the second screen 520, the processor may differently display the second icon 525b selected by the first gesture between the two icons 525a and 525b displayed in the specific region 525.

Figure 6A:
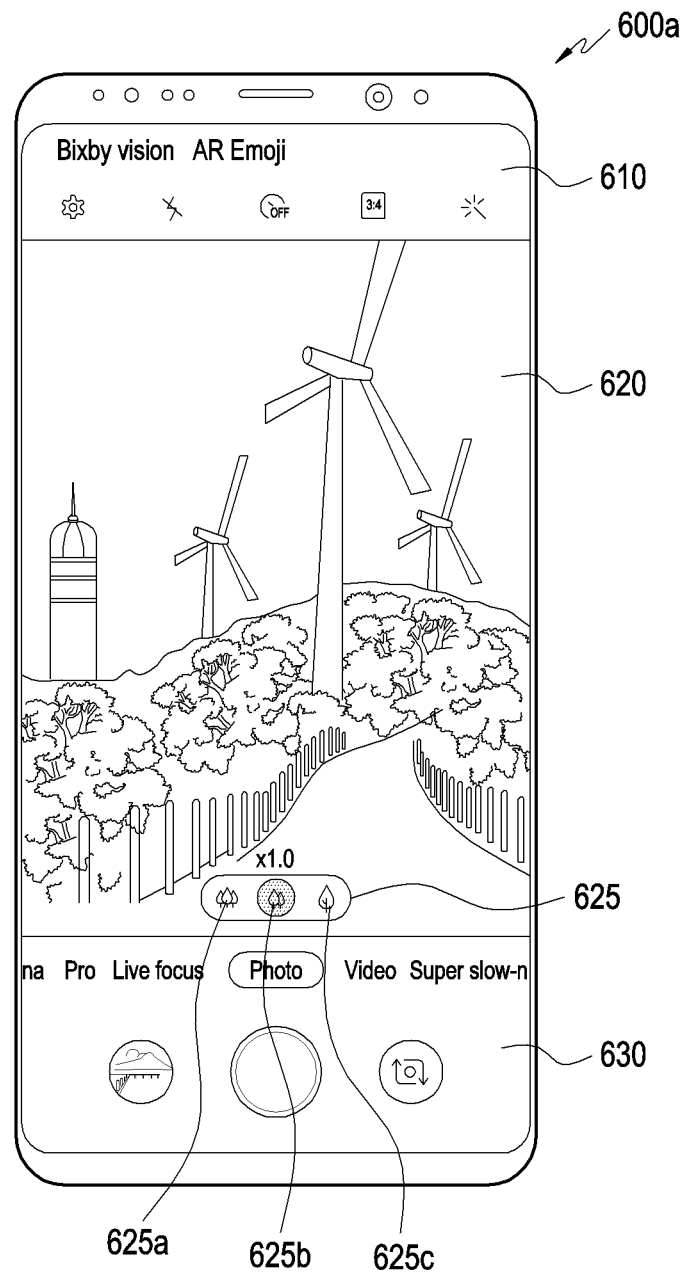
FIGS. 6A, 6B and 6C are views for describing an operation of controlling an image in an electronic device, according to various embodiments of the disclosure.
Figure 6B:
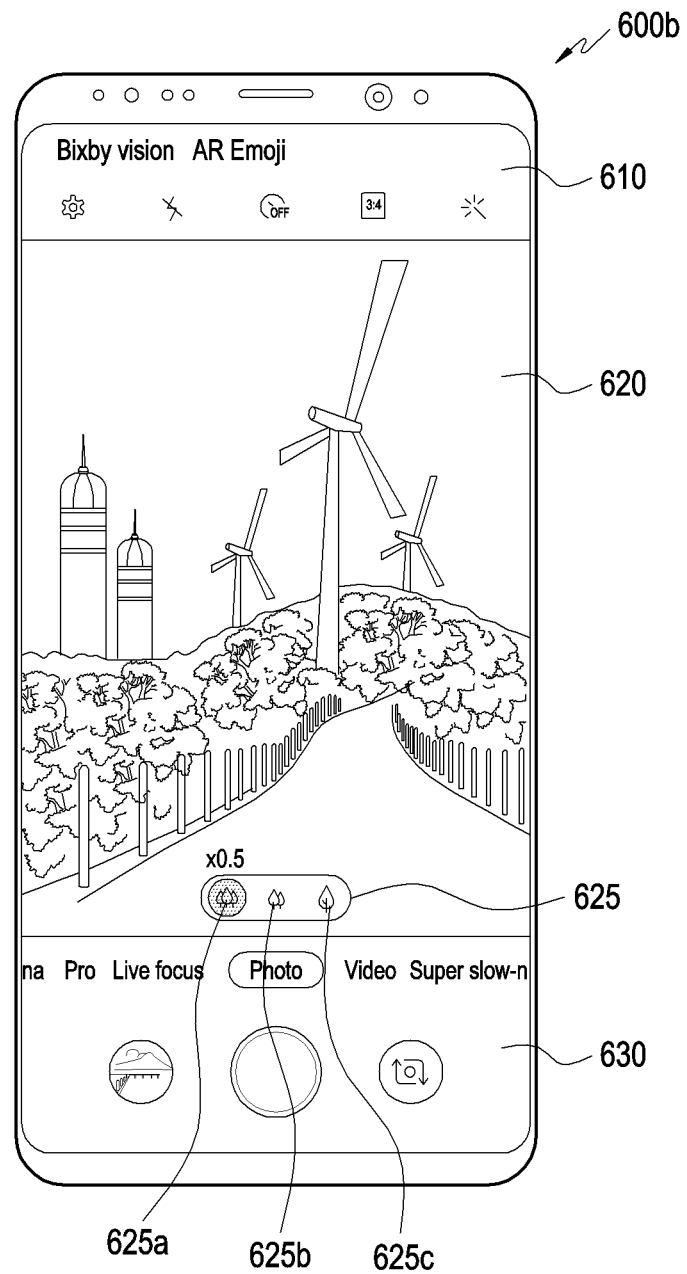
Figure 6C:
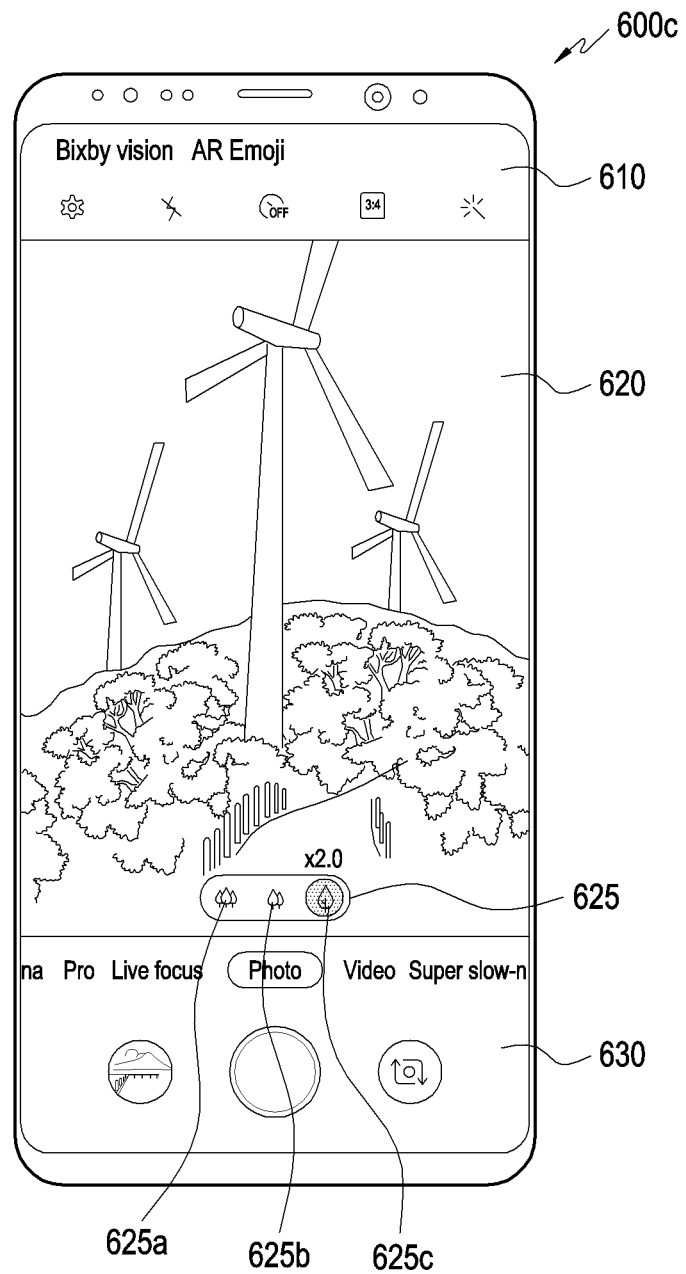

FIGS. 6A, 6B, and 6C are views 600a, 600b, and 600c for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 6A, upon switchover to a first photographing mode in response to selection of the icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 510 through 530 to display icons indicating various functions to be performed with respect to images obtained in the first photographing mode, on the first screen 610, and icons indicating various shooting functions and an icon indicating a shooting button on the third screen 630. The processor may display an image obtained through a camera (e.g., the camera module 180 of FIGS. 1 and 2 or the camera 310 of FIG. 3) on the second screen 620, and display a first icon 625a corresponding to a first lens (e.g., an ultra lens) included in the camera, a second icon 625b corresponding to a second lens (e.g., a standard lens) included in the camera, and a third icon 625c corresponding to a third lens (e.g., a tele lens) included in the camera, for example, at equal intervals, based the first position information, in a specific region 625 of the second screen 620. Referring to FIG. 6A, upon selection of the first icon 625a among the three icons 625a, 625b, and 625c corresponding to the three lenses by a first gesture (e.g., a tap), the processor may display an image reduced at a zoom level (e.g., a magnification of ×0.5) of the first lens (e.g., an ultra lens) corresponding to the first icon 625a on the second screen 620. While displaying the image received at the zoom level (e.g., ×0.5) of the first lens (e.g., the ultra lens) corresponding to the first icon 625a on the second screen 620, the processor may differently display the first icon 625a selected by the first gesture among the three icons 625a, 625b, and 625c displayed in the specific region 625.

Referring to FIG. 6B, upon selection of the second icon 625b among the three icons 625a, 625b, and 625c corresponding to the three lenses by the first gesture (e.g., a tap), the processor may display an image reduced at a zoom level (e.g., a magnification of ×1.0) of the second lens (e.g., a standard lens) corresponding to the second icon 625b on the second screen 620. While displaying the image received at the zoom level (e.g., ×1.0) of the second lens (e.g., the standard lens) corresponding to the second icon 625b on the second screen 620, the processor may differently display the second icon 625c selected by the first gesture among the three icons 625a, 625b, and 625c displayed in the specific region 625.

Referring to FIG. 6C, upon selection of the third icon 625c among the three icons 625a, 625c, and 625c corresponding to the three lenses by the first gesture (e.g., a tap), the processor may display an image enlarged at a zoom level (e.g., a magnification of ×2.0) of the third lens (e.g., a tele lens) corresponding to the third icon 625c on the second screen 620. While displaying the image received at the zoom level (e.g., ×2.0) of the third lens (e.g., the tele lens) corresponding to the third icon 625c on the second screen 620, the processor may differently display the third icon 625c selected by the first gesture among the three icons 625a, 625b, and 625c displayed in the specific region 625.

Figure 7:
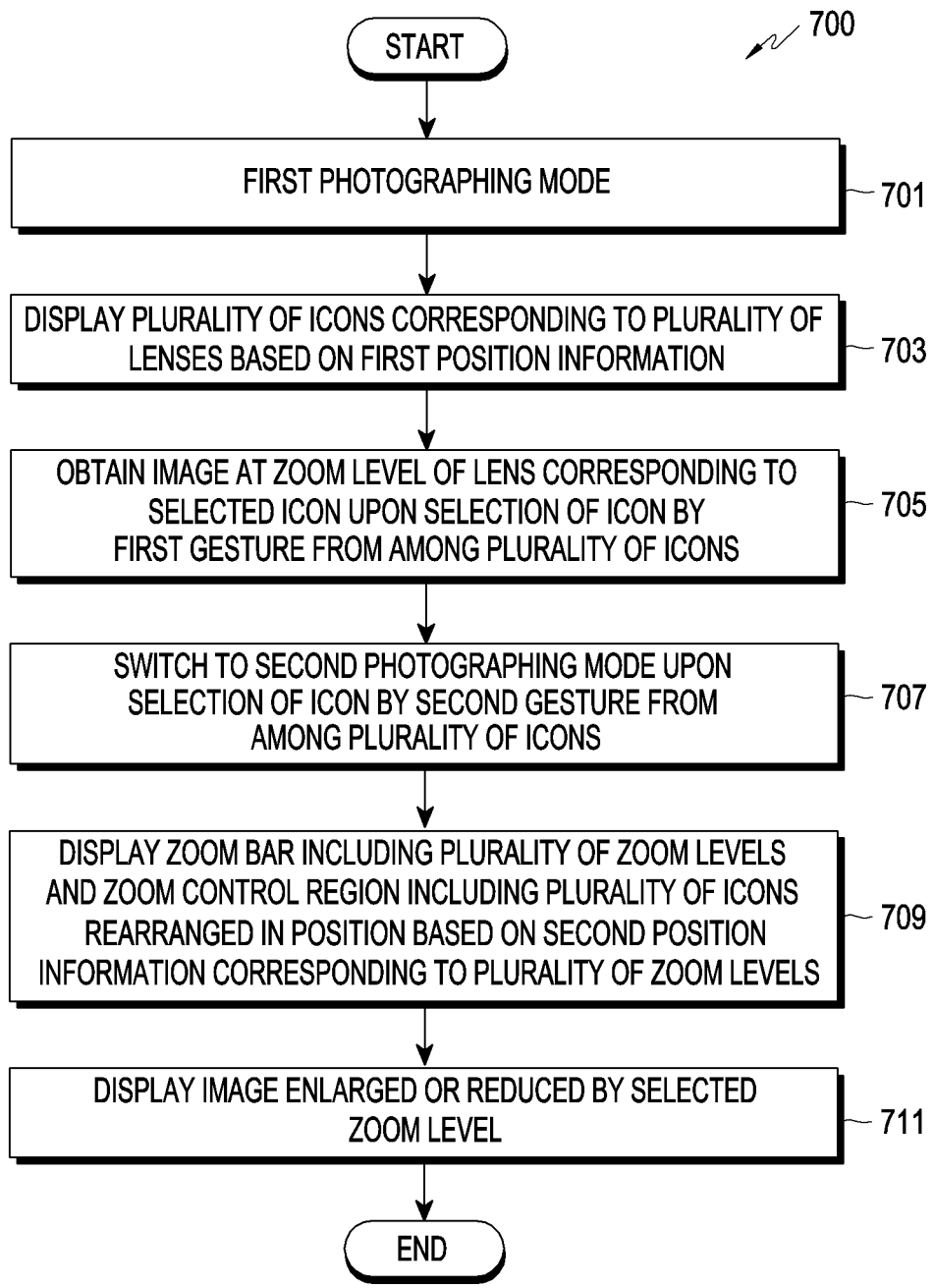
FIG. 7 is a flowchart for describing an operation of controlling an image in an electronic device, according to an embodiment of the disclosure.

FIG. 7 is a flowchart 700 for describing an operation of controlling an image in an electronic device, according to an embodiment of the disclosure. An image control method may include operations 701 through 711. The image control method may be performed by at least one of an electronic device (e.g., 101 of FIG. 1 or 301 of FIG. 3) or at least one processor (e.g., the processor 120 of FIG. 1 or 320 of FIG. 3).

Referring to FIG. 7, in operation 701, the processor (e.g., the processor 120 of FIG. 1 or the processor 320 of FIG. 3) may switch to a first photographing mode in response to selection of an icon corresponding to a camera application.

In operation 703, in response to switchover to the first photographing mode, the processor (e.g., the processor 120 of FIG. 1 or the processor 320 of FIG. 1) may display a plurality of icons corresponding to a plurality of lenses included in a camera (e.g., the camera module 180 of FIGS. 1 and 2 or the camera 310 of FIG. 3) on the display (the display 160 of FIG. 1 or the display 360 of FIG. 3) based on first position information. The first position information is information for displaying the plurality of icons in the first photographing mode, and based on the first position information, the plurality of icons may be displayed arranged at equal intervals.

In operation 705, the processor (e.g., the processor 120 of FIG. 1 or the processor 320 of FIG. 3) may detect selection of an icon by a first gesture (e.g., a tap or a swipe) from among the plurality of icons displayed based on the first position information in the first photographing mode. The processor may select a lens corresponding to the icon selected by the first gesture among a plurality of lenses included in a camera (e.g., the camera module 180 of FIGS. 1 and 2 or the camera 310 of FIG. 3) and obtain and display an image at a zoom level of the lens.

In operation 707, the processor (e.g., the processor 120 of FIG. 1 or the processor 320 of FIG. 3) may switch to a second photographing mode upon selection of an icon by a second gesture (e.g., a long tap) from among the plurality of icons corresponding to the plurality of lenses.

In operation 709, the processor (e.g., the processor 120 of FIG. 1 or the processor 320 of FIG. 3) may display a zoom control region comprising a zoom bar including a plurality of zoom levels and the plurality of icons rearranged in position based on the second position information corresponding to the plurality of zoom levels, in the second photographing mode. The processor may set a zoom level of a lens corresponding to an icon selected by the first gesture to a reference zoom level and display a zoom bar including the plurality of zoom levels with respect to the reference zoom level, in the first photographing mode. The processor may rearrange each of the plurality of icons in a position corresponding to a zoom level among the plurality of zoom levels. For example, the processor may display each of the plurality of icons in an upper end or a lower end of a zoom bar indicating the plurality of zoom levels to prevent the plurality of zoom levels from being hidden by the plurality of icons.

In operation 711, upon detection of the third gesture (e.g., a swipe) in the zoom control region, the processor (e.g., the processor 120 of FIG. 1 or the processor 320 of FIG. 3) may obtain an image enlarged or reduced at a zoom level of a lens corresponding to a zoom level selected by the third gesture from among the plurality of zoom levels and display the obtained image in a display (e.g., the display 160 of FIG. 1 or the display 360 of FIG. 3).

Figure 8:
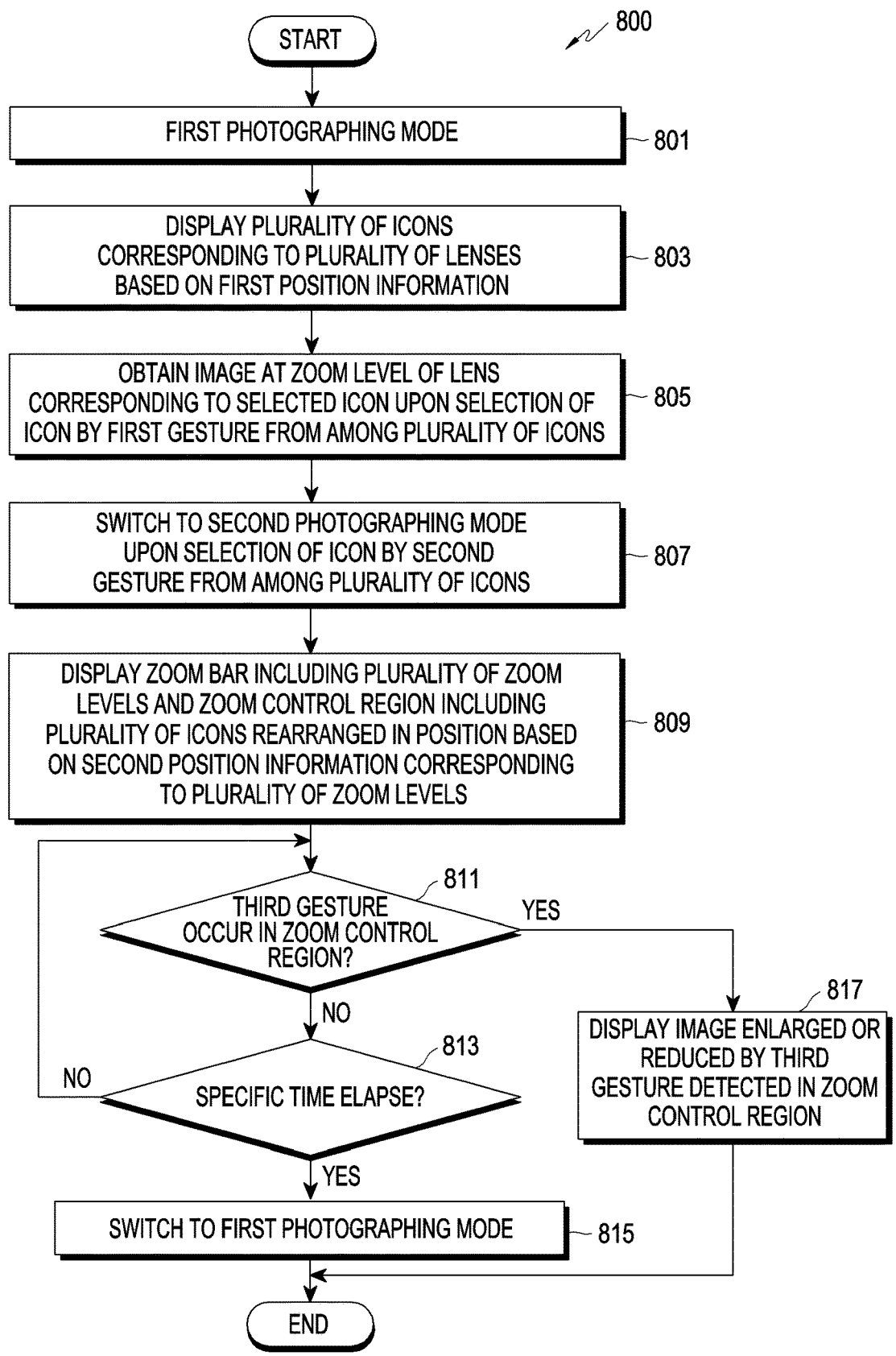
FIG. 8 is a flowchart for describing an operation of controlling an image in an electronic device, according to an embodiment of the disclosure.

FIG. 8 is a flowchart 800 for describing an operation of controlling an image in an electronic device, according to an embodiment of the disclosure. An image control method may include operations 801 through 817. The image control method may be performed by at least one of an electronic device (e.g., 101 of FIG. 1 or 301 of FIG. 3) or at least one processor (e.g., the processor 120 of FIG. 1 or 320 of FIG. 3).

Referring to FIG. 8, in operation 801, the processor (e.g., the processor 120 of FIG. 1 or the processor 320 of FIG. 3) may switch to a first photographing mode in response to selection of an icon corresponding to a camera application.

In operation 803, in response to switchover to the first photographing mode, the processor (e.g., the processor 120 of FIG. 1 or the processor 320 of FIG. 1) may display a plurality of icons corresponding to a plurality of lenses included in a camera (e.g., the camera module 180 of FIGS. 1 and 2 or the camera 310 of FIG. 3) on the display (the display 160 of FIG. 1 or the display 360 of FIG. 3) based on first position information. The first position information is information for displaying the plurality of icons in the first photographing mode, and based on the first position information, the plurality of icons may be displayed arranged at equal intervals.

In operation 805, the processor (e.g., the processor 120 of FIG. 1 or the processor 320 of FIG. 3) may detect selection of an icon by ae first gesture (e.g., a tap or a swipe) from among the plurality of icons displayed based on the first position information in the first photographing mode. The processor may select a lens corresponding to the icon selected by the first gesture among a plurality of lenses included in a camera (e.g., the camera module 180 of FIGS. 1 and 2 or the camera 310 of FIG. 3) and obtain and display an image at a zoom level of the lens.

In operation 807, the processor (e.g., the processor 120 of FIG. 1 or the processor 320 of FIG. 3) may switch to a second photographing mode upon selection of an icon by a second gesture (e.g., a long tap) from among the plurality of icons corresponding to the plurality of lenses.

In operation 809, the processor (e.g., the processor 120 of FIG. 1 or the processor 320 of FIG. 3) may display a zoom control region comprising a zoom bar including a plurality of zoom levels and the plurality of icons rearranged in position based on the second position information corresponding to the plurality of zoom levels, in the second photographing mode. The processor may set a zoom level of a lens corresponding to an icon selected by the first gesture to a reference zoom level and display a zoom bar including the plurality of zoom levels with respect to the reference zoom level, in the first photographing mode. The processor may rearrange each of the plurality of icons in a position corresponding to a zoom level among the plurality of zoom levels. For example, the processor may display each of the plurality of icons in an upper end or a lower end of a zoom bar indicating the plurality of zoom levels to prevent the plurality of zoom levels from being hidden by the plurality of icons.

In operation 811, the processor (e.g., the processor 120 of FIG. 1 or the processor 320 of FIG. 3) may determine whether the third gesture (e.g., a swipe) is detected in the zoom control region.

When the processor (e.g., the processor 120 of FIG. 1 or the processor 320 of FIG. 3) determines that the third gesture (e.g., a swipe) is not detected in the zoom control region in operation 811 and identifies an elapse of a specific time in operation 813, the processor may switch to the first photographing mode to display the plurality of icons corresponding to the plurality of lenses, based on the first position information, in operation 815.

Upon detection of the third gesture (e.g., a swipe) in the zoom control region in operation 811, the processor may obtain an image enlarged or reduced at a zoom level of a lens corresponding to a zoom level selected by the third gesture from among the plurality of zoom levels and display the obtained image in a display (e.g., the display 160 of FIG. 1 or the display 360 of FIG. 3), in operation 817.

Figure 9A:
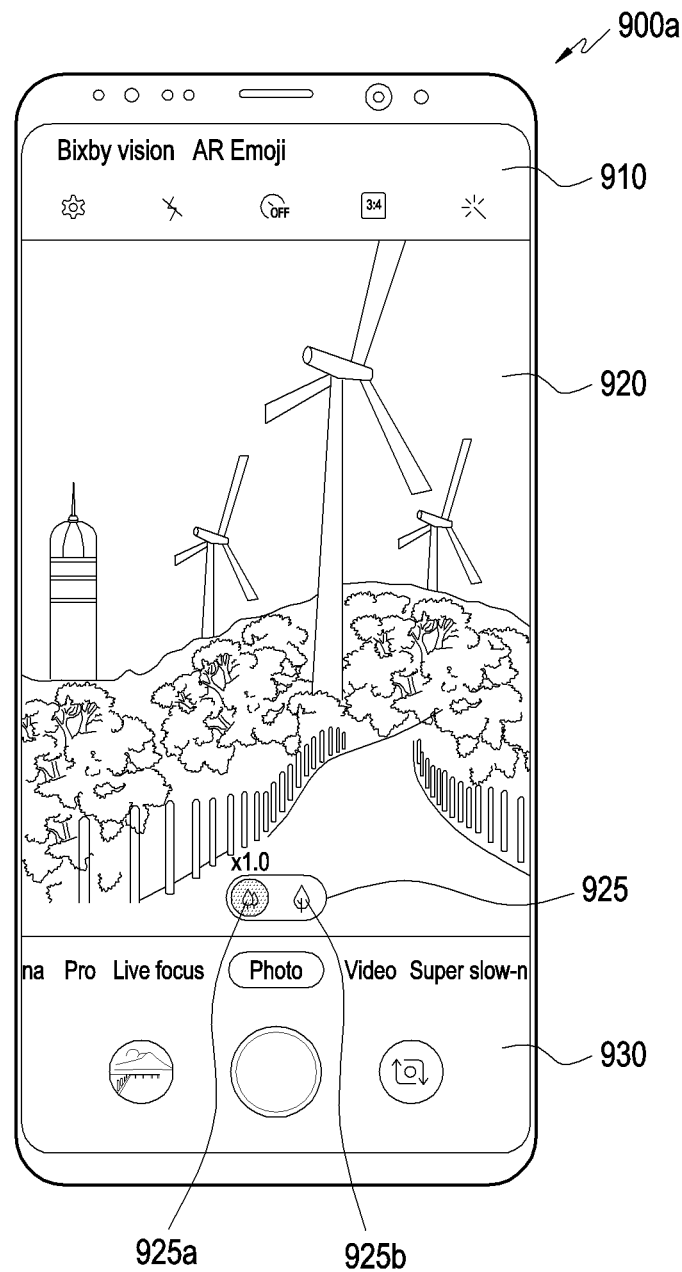
FIGS. 9A and 9B are views for describing an operation of controlling an image in an electronic device, according to various embodiments of the disclosure.
Figure 9B:
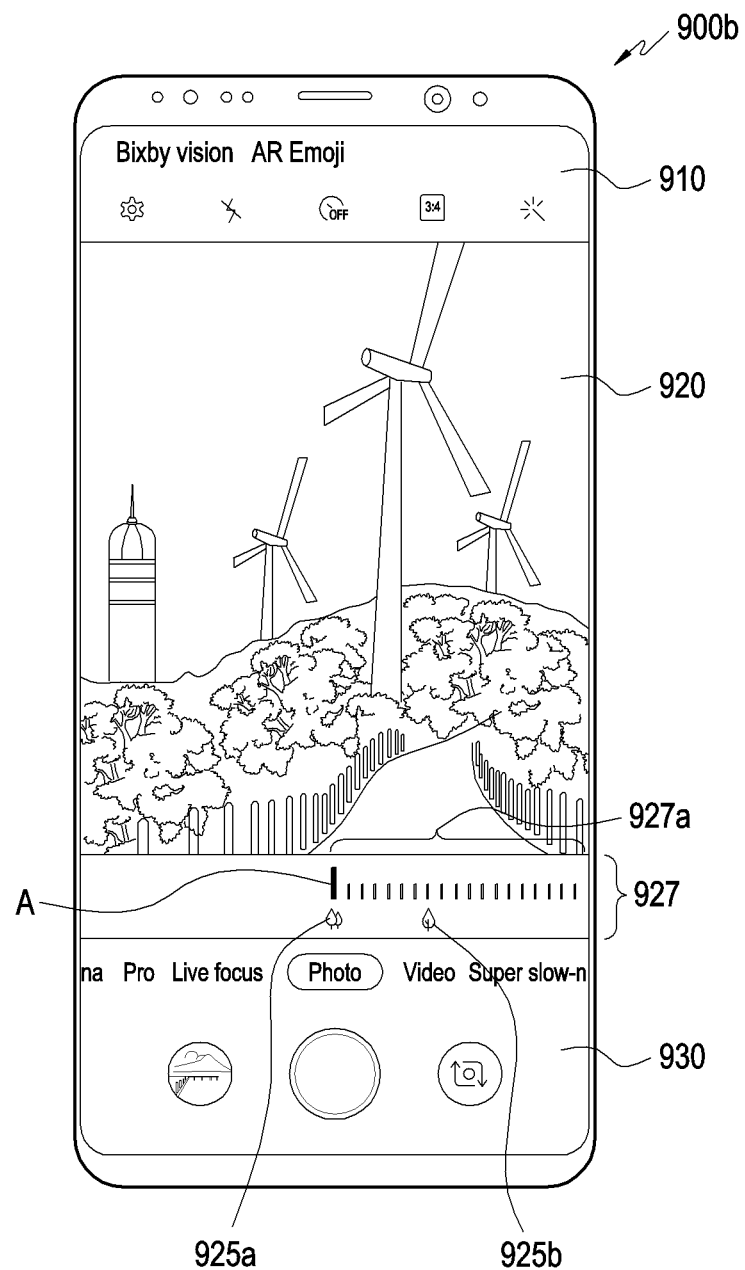

FIGS. 9A and 9B are views 900a and 900b for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 9A, upon switchover to a first photographing mode in response to selection of an icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 910 through 930 to display icons indicating various functions to be performed with respect to images obtained in the first photographing mode, on the first screen 910, and icons indicating various shooting functions and an icon indicating a shooting button on the third screen 930. The processor may display an image obtained through a camera (e.g., the camera module 180 of FIGS. 1 and 2 or the camera 310 of FIG. 3) on the second screen 920, and display a first icon 925*a* corresponding to a first lens (e.g., a standard lens) included in the camera and a second icon 925*b* corresponding to a second lens (e.g., a tele lens) included in the camera in a specific region 925 of the second screen 920. Referring to FIG. 9A, when the first icon 925*a* is selected between the two icons 925*a* and 925*b* corresponding to the two lenses by a first gesture (e.g., a tap) or the first icon 925*a* is set to a default icon, the processor may display an image received at a zoom level (e.g., a magnification of ×1.0) of the first lens (e.g., a standard lens) corresponding to the first icon 925*a* on the second screen 920. While displaying the image received at the zoom level (e.g., ×1.0) of the first lens (e.g., the standard lens) corresponding to the first icon 925*a* on the second screen 920, the processor may differently display the first icon 925*a* that is selected by the first gesture or set by default between the two icons 925*a* and 925*b* displayed in the specific region 925.

When the first icon 925*a* or a second icon 925*b* is selected by a second gesture (e.g., a swipe) in the first photographing mode after selection of the first lens (e.g., a standard lens) corresponding to the first icon 925*a* by the first gesture in the first photographing mode in FIG. 9A, a processor (e.g., the processor 120 of FIG. 1 or the processor 320 of FIG. 3) may switch to a second photographing mode to display a zoom control region 927 comprising a zoom bar 927*a* including a plurality of zoom levels and the plurality of icons 925*a* and 925*b* rearranged in position based on the second position information, as shown in FIG. 9B. The processor may display the zoom control region 927 on the second screen 920 in the second photographing mode. The processor may display, in the zoom control region 927, the zoom bar 927*a* including the plurality of zoom levels having, as a reference zoom level A, a zoom level (e.g., a magnification of ×1.0) of the first lens (e.g., a standard lens) corresponding to the first icon 925*a* selected by the first gesture in the first photographing mode. The processor may rearrange and display each of the plurality of icons 925*a* and 925*b* in a position corresponding to a zoom level among the plurality of zoom levels. The processor may display each of the plurality of icons 925*a* and 925*b* in an upper end or a lower end of the zoom bar 927*a* indicating the plurality of zoom levels to prevent the plurality of zoom levels from being hidden by the plurality of icons 925*a* and 925*b*.

Figure 10A:
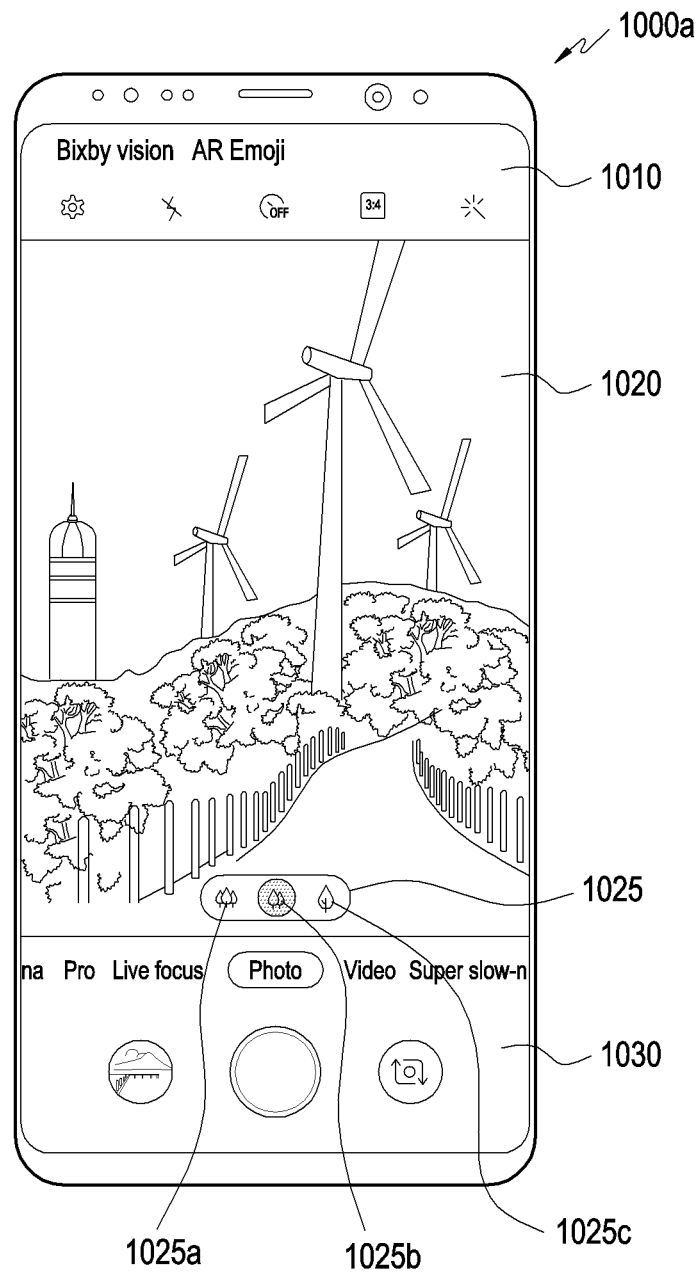
FIGS. 10A and 10B are views for describing an operation of controlling an image in an electronic device, according to various embodiments of the disclosure.
Figure 10B:
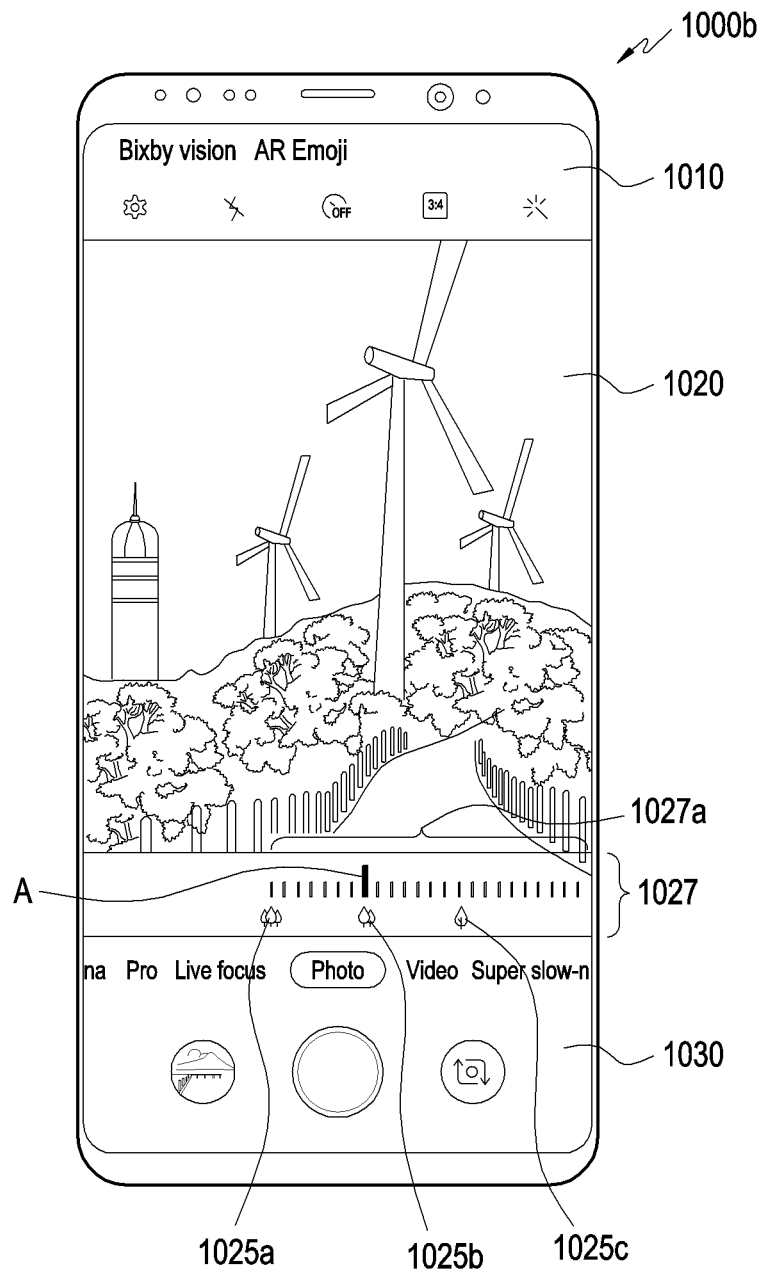

FIGS. 10A and 10B are views 1000*a* and 1000*b* for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 10A, upon switchover to a first photographing mode in response to selection of an icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 1010 through 1030 to display icons indicating various functions to be performed with respect to images obtained in the first photographing mode, on the first screen 1010, and icons indicating various shooting functions and an icon indicating a shooting button on the third screen 1030. The processor may display an image obtained through a camera (e.g., the camera module 180 of FIGS. 1 and 2 or the camera 310 of FIG. 3) on the second screen 1020, and display a first icon 1025*a* corresponding to a first lens (e.g., an ultra lens) included in the camera, a second icon 1025*b* corresponding to a second lens (e.g., a standard lens) included in the camera, and a third icon 1025*c* corresponding to a third lens (e.g., a tele lens) included in the camera, in a specific region 1025 of the second screen 1020. Referring to FIG. 10A, when the second icon 1025*b* is selected between the three icons 1025*a*, 1025*b*, and 1025*c* corresponding to the three lenses by a first gesture (e.g., a tap) or the second icon 1025*b* is set to a default icon, the processor may display an image received at a zoom level (e.g., a magnification of ×1.0) of the second lens (e.g., a standard lens) corresponding to the second icon 1025*b* on the second screen 1020. While displaying the image received at the zoom level (e.g., ×1.0) of the second lens (e.g., the standard lens) corresponding to the second icon 1025*b* on the second screen 1020, the processor may differently display the second icon 1025*b* that is selected by the first gesture or set by default among the three icons 1025*a*, 1025*b*, and 1025*c* displayed in the specific region 1025.

When any one of the second icon 1025*b* or the third icon 1025*c* is selected by a second gesture (e.g., a swipe) in the first photographing mode after selection of the second lens (e.g., a standard lens) corresponding to the second icon 1025*b* by the first gesture in the first photographing mode, as shown in FIG. 10A, a processor (e.g., the processor 120 of FIG. 1 or the processor 320 of FIG. 3) may switch to a second photographing mode to display a zoom control region 1027 comprising a zoom bar 1027*a* including a plurality of zoom levels and the plurality of icons 1025*a*, 1025*b*, and 1025*c* rearranged in position based on the second position information, as shown in FIG. 10B. The processor may display the zoom control region 1027 on the second screen 1020 in the second photographing mode. The processor may display, in the zoom control region 1027, the zoom bar 1027*a* including the plurality of zoom levels having, as a reference zoom level A, a zoom level (e.g., a magnification of ×1.0) of the second lens (e.g., a standard lens) corresponding to the second icon 1025*b* selected by the first gesture in the first photographing mode. The processor may rearrange and display each of the plurality of icons 1025*a*, 1025*b*, and 1025*c* in a position corresponding to a zoom level among the plurality of zoom levels. The processor may display each of the plurality of icons 1025*a*, 1025*b*, and 1025*c* in an upper end or a lower end of the zoom bar 1027*a* indicating the plurality of zoom levels to prevent the plurality of zoom levels from being hidden by the plurality of icons 1025*a*, 1025*b*, and 1025*c*.

FIGS. 11A to 11E are views 1100*a* through 1100*e* for describing an operation of controlling an image in an electronic device, according to various embodiments of the disclosure. A photographing mode switch operation may be performed by at least one of an electronic device (e.g., 101 of FIG. 1 or 301 of FIG. 3) or at least one processor (e.g., the processor 120 of FIG. 1 or 320 of FIG. 3).

Figure 11A:
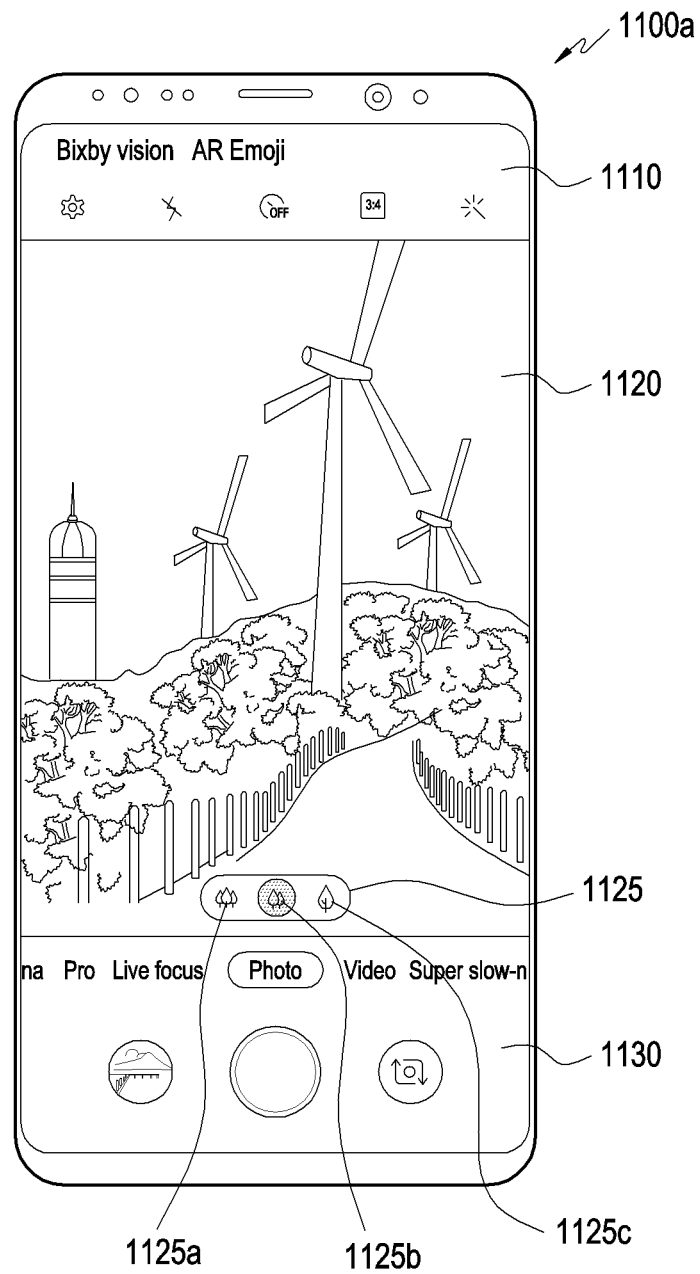
FIGS. 11A, 11B, 11C, 11D and 11E are views for describing a photographing mode switch operation in an electronic device, according to various embodiments of the disclosure.

Referring to FIG. 11A, upon switchover to a first photographing mode in response to selection of an icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 1110 through 1130 to display icons indicating various functions to be performed with respect to images received in the first photographing mode, on the first screen 1110, and icons indicating various shooting functions and an icon indicating a shooting button on the third screen 1130. The processor may display an image received through a camera (e.g., the camera module 180 of FIGS. 1 and 2 or the camera 310 of FIG. 3) on a second screen 1120, and display a first icon 1125a corresponding to a first lens (e.g., an ultra lens) included in the camera, a second icon 1125b corresponding to a second lens (e.g., a standard lens) included in the camera, and a third icon 1125c corresponding to a third lens (e.g., a tele lens) included in the camera, in a specific region 1125 of the second screen 1120.

Figure 11B:
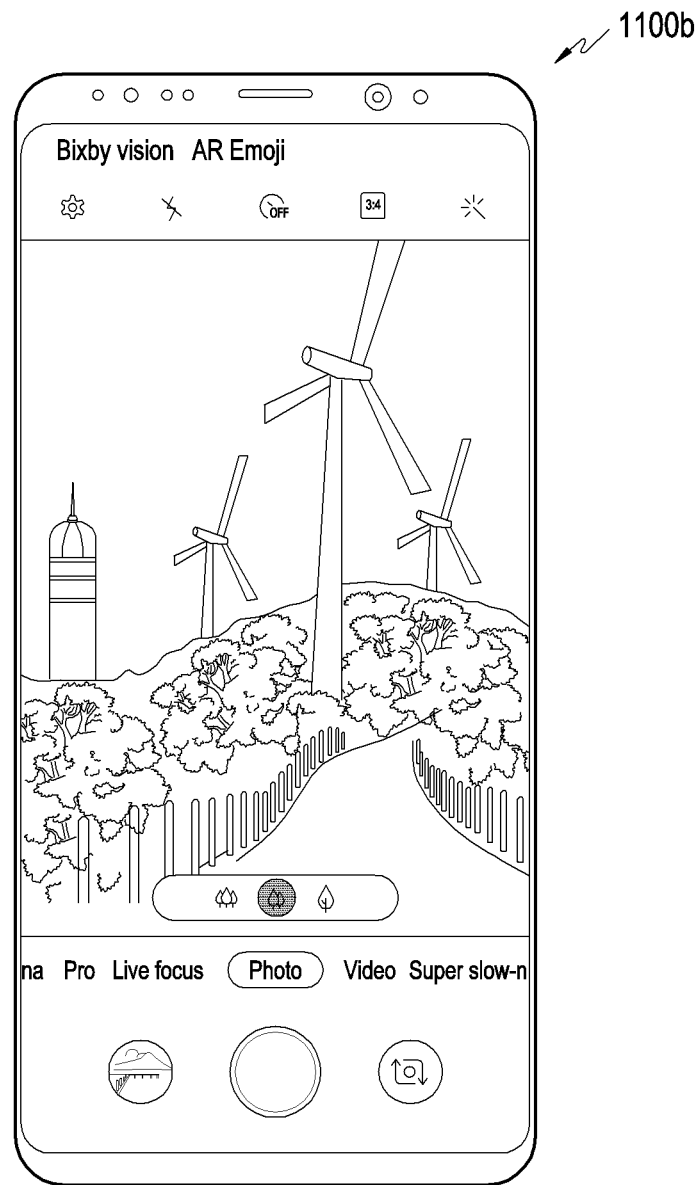
Figure 11C:
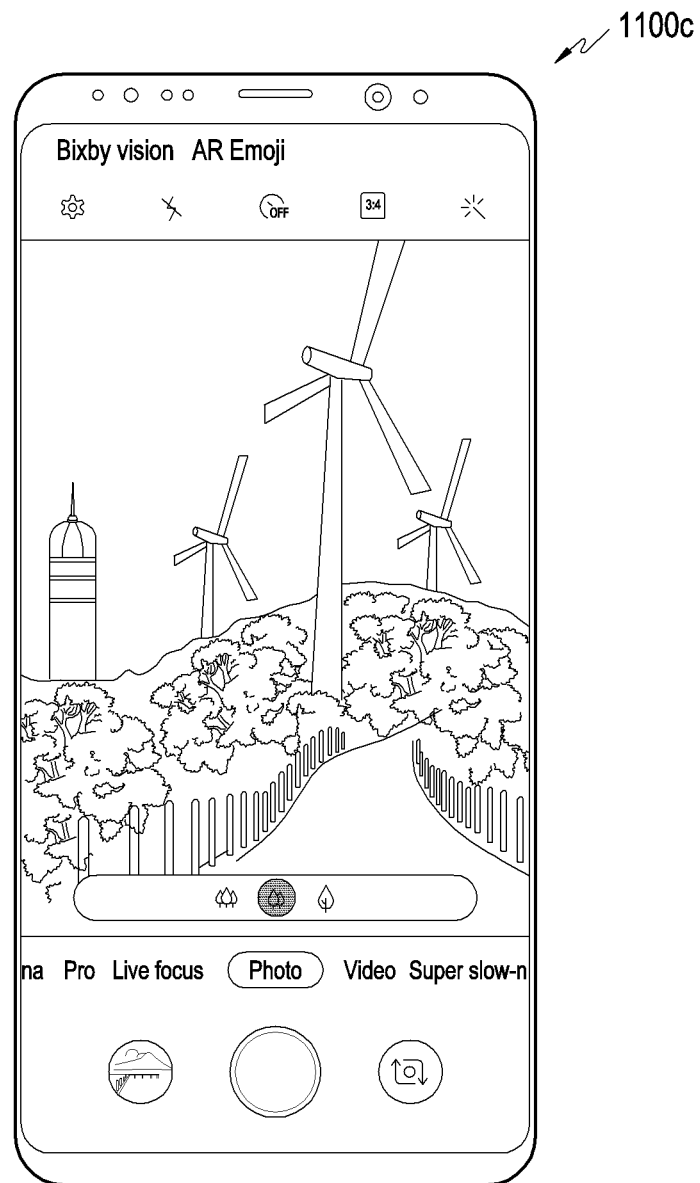
Figure 11D:
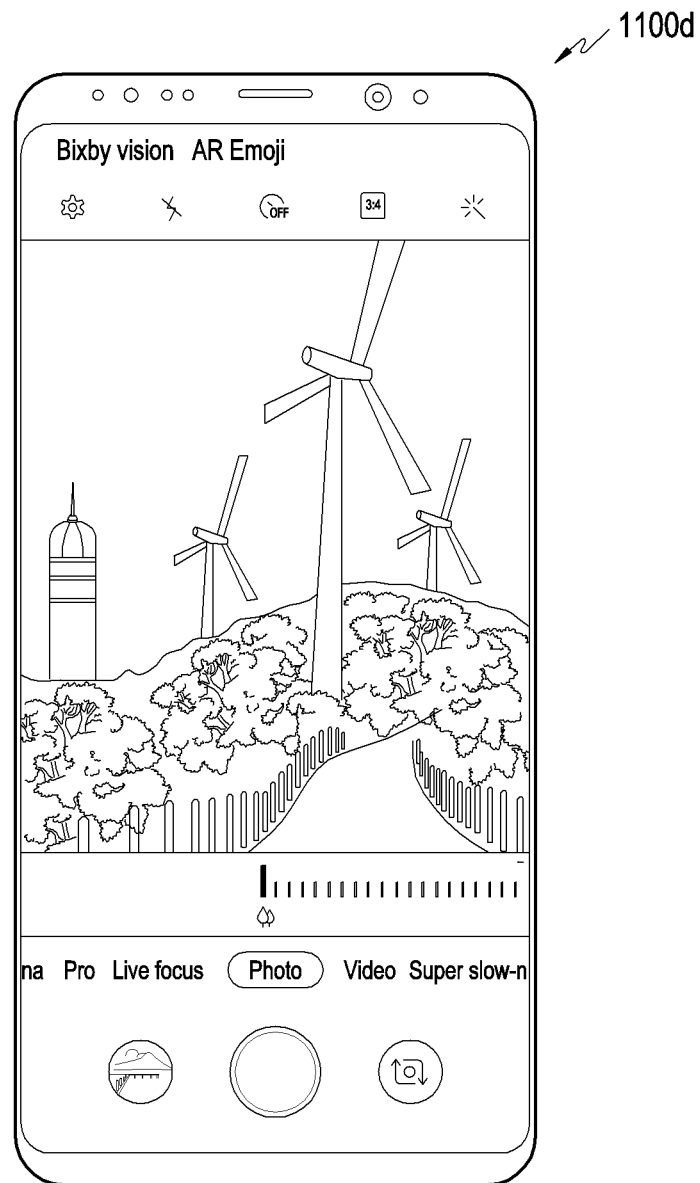
Figure 11E:
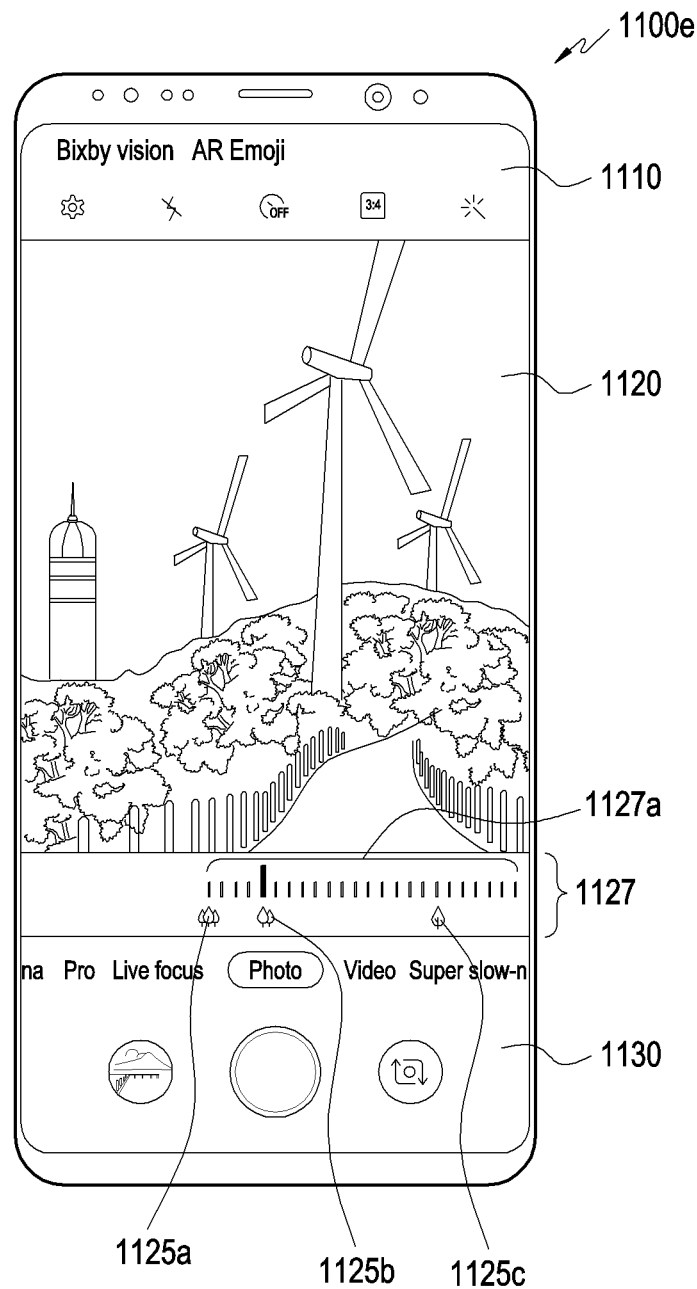

When any one of the first icon 1125a, the second icon 1125b, or the third icon 1125c is selected by the second gesture (e.g., a swipe) in the first photographing mode after selection of the second lens (e.g., a standard lens) corresponding to the second icon 1125b by the first gesture in the first photographing mode as shown in FIG. 11A, a processor (e.g., the processor 120 of FIG. 1 or the processor 320 of FIG. 3) may switch to the second photographing mode to display a zoom control region as shown in FIG. 11E while displaying an intermediate process such as visual interaction animation as shown in FIGS. 11B through 11D. Referring to FIG. 11E, the processor (e.g., the processor 120 of FIG. 1 or the processor 320 of FIG. 3) may switch to a second photographing mode to display a zoom control region 1127 comprising a zoom bar 1127a including a plurality of zoom levels and the plurality of icons 1125a, 1125b, and 1125c rearranged in position based on the second position information.

FIGS. 12A to 12D are views 1200a through 1200d for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Figure 12A:
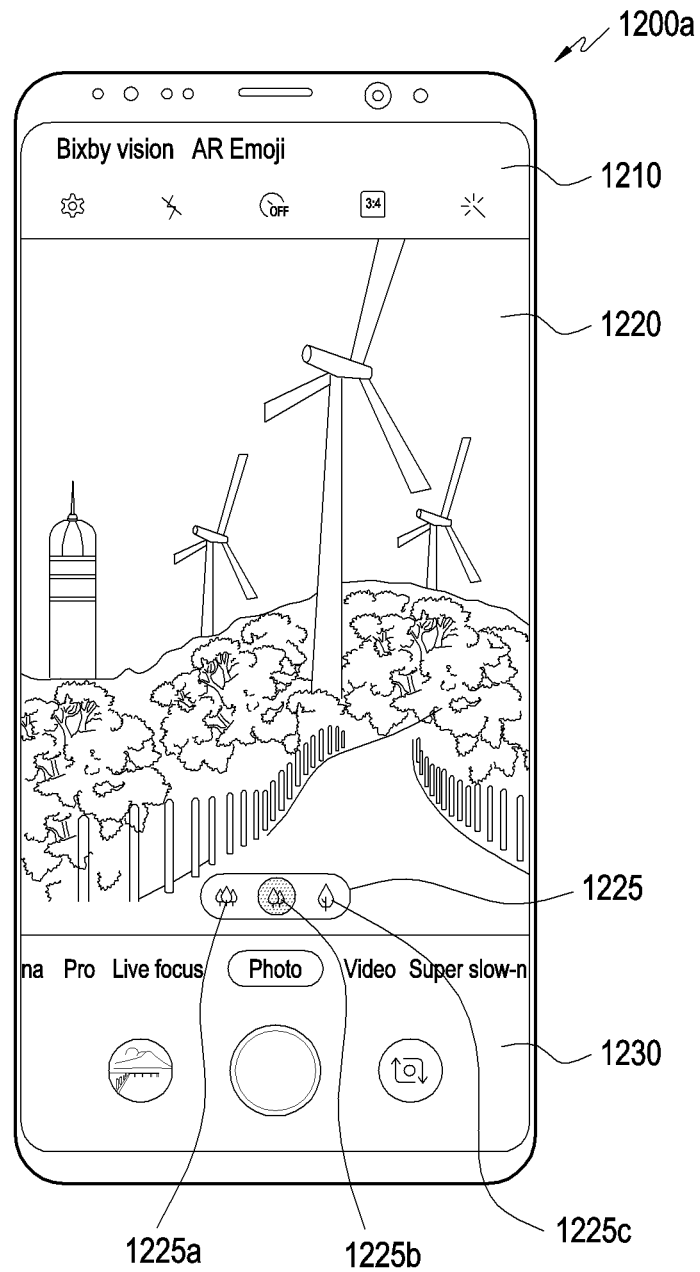
FIGS. 12A, 12B, 12C and 12D are views for describing an operation of controlling an image in an electronic device, according to various embodiments of the disclosure.

Referring to FIG. 12A, upon switchover to a first photographing mode in response to selection of an icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 1210 through 1230 to display icons indicating various functions to be performed with respect to images obtained in the first photographing mode, on the first screen 1210, and icons indicating various shooting functions and an icon indicating a shooting button on the third screen 1230. The processor may display an image received through a camera (e.g., the camera module 180 of FIGS. 1 and 2 or the camera 310 of FIG. 3) on a second screen 1220, and display a first icon 1225a corresponding to a first lens (e.g., an ultra lens) included in the camera, a second icon 1225b corresponding to a second lens (e.g., a standard lens) included in the camera, and a third icon 1225c corresponding to a third lens (e.g., a tele lens) included in the camera, in a specific region 1225 of the second screen 1220. Referring to FIG. 12A, when the second icon 1225b is selected between the three icons 1225a, 1225b, and 1225c corresponding to the three lenses by the first gesture (e.g., a tap) or the second icon 1225b is set to a default icon, the processor may display an image received at a zoom level (e.g., a magnification of ×1.0) of the second lens (e.g., a standard lens) corresponding to the second icon 1225b on the second screen 1220. While displaying the image received at the zoom level (e.g., ×1.0) of the second lens (e.g., the standard lens) corresponding to the second icon 1225b on the second screen 1220, the processor may differently display the second icon 1225b that is selected by the first gesture or set by default among the three icons 1225a, 1225b, and 1225c displayed in the specific region 1225.

Figure 12B:
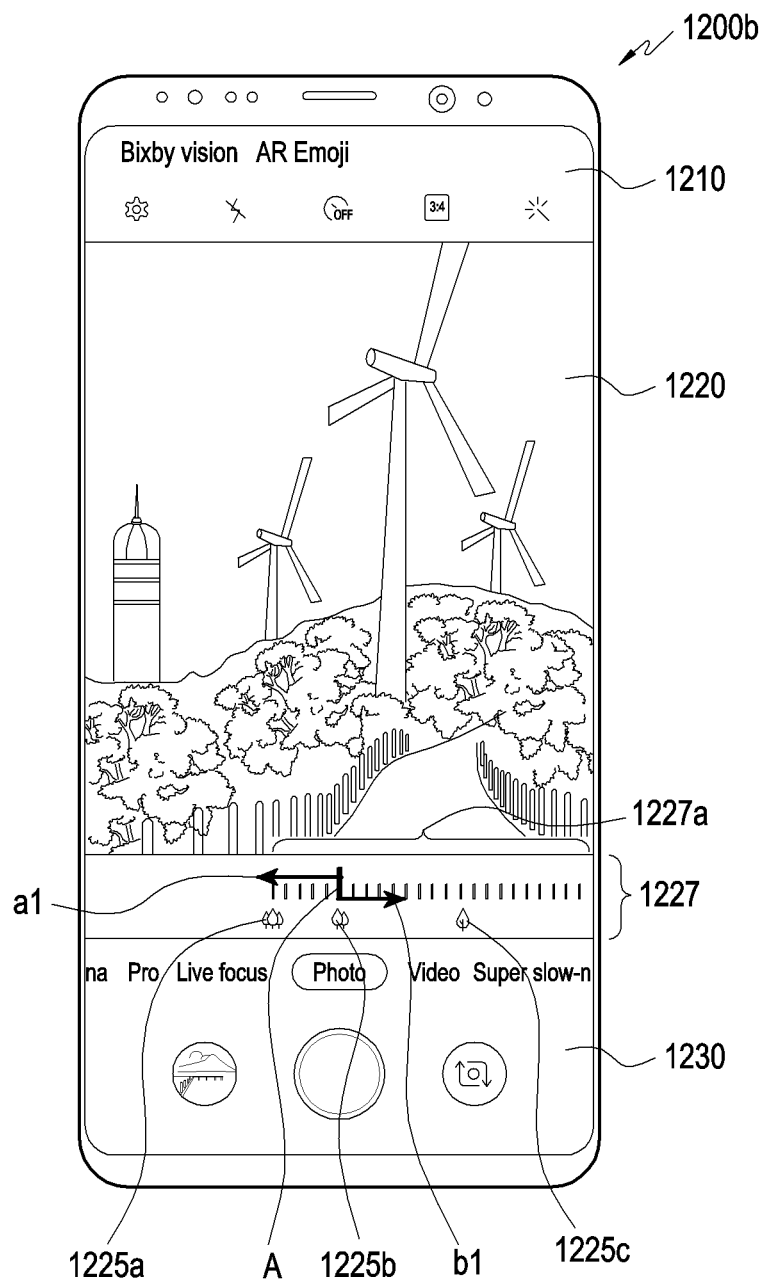

After selection of the second lens (e.g., a standard lens) corresponding to the second icon 1225b by a first gesture in the first photographing mode, when any one of the second icon 1225b or the third icon 1225c is selected by the second gesture (e.g., a swipe) in the first photographing mode as shown in FIG. 12A, a processor (e.g., the processor 120 of FIG. 1 or the processor 320 of FIG. 3) may switch to a second photographing mode to display a zoom control region 1227 comprising a zoom bar 1227a including a plurality of zoom levels and the plurality of icons 1225a, 1225b, and 1225c rearranged in position based on the second position information corresponding to the plurality of zoom levels, as shown in FIG. 12B. In FIG. 12B, the processor may detect the third gesture, e.g., a swipe, for controlling the zoom bar 1227a to enlarge or reduce the image in the zoom control region 1227. The processor may detect a swipe for movement to the left (or left movement) a1 in the zoom control region 1227, and determine a zoom level selected by the swipe for the left movement a1 from among the plurality of zoom levels of the zoom bar 1227a.

Figure 12C:
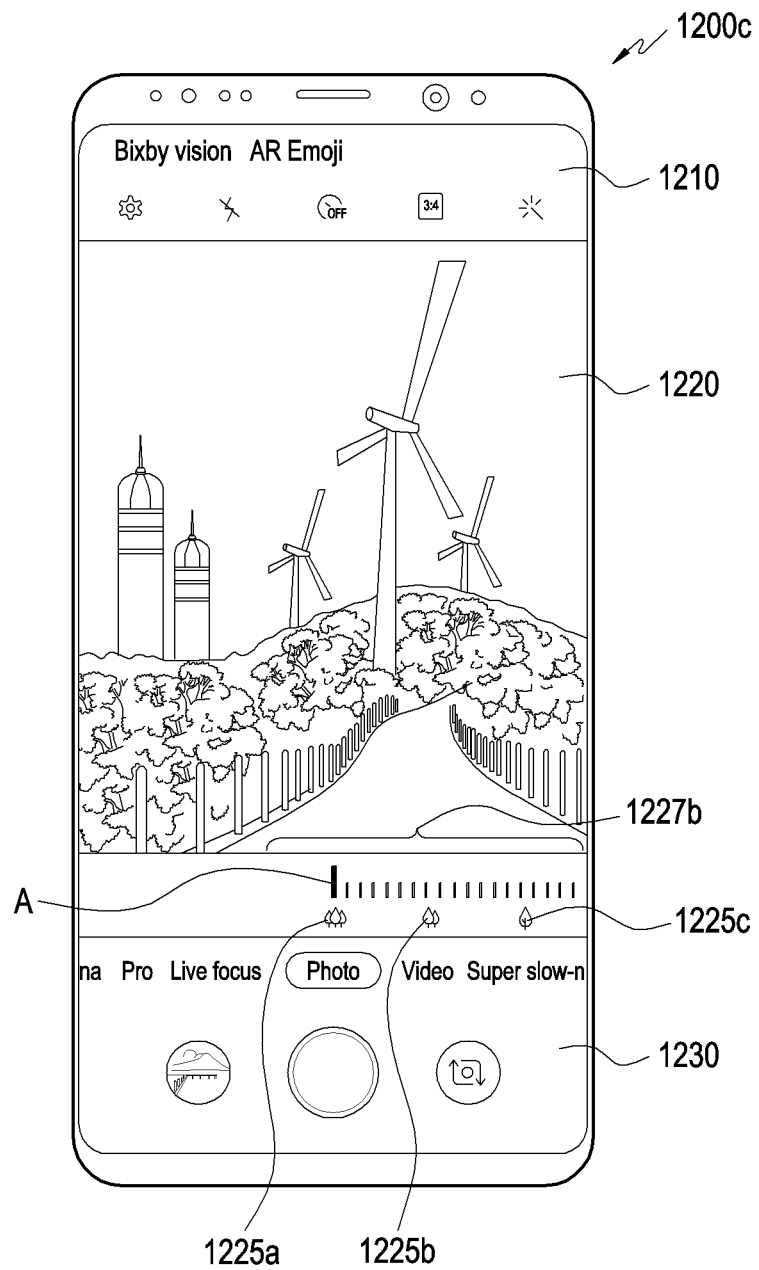

When determining the zoom level (e.g., a magnification of ×0.5) of the first lens (e.g., an ultra lens) corresponding to the first icon 1225a by a swipe for the left movement a1 in FIG. 12B, the processor may display a zoom bar 1227b including a plurality of zoom levels having the first icon 1225a as a reference zoom level A in the zoom control region 1227 as shown in FIG. 12C. The processor may rearrange the plurality of zoom levels based on the first icon 1225a as the reference zoom level A is changed into the first icon 1225a, and rearrange and display the plurality of icons 1225a, 1225b, and 1225c based on the second position information changed based on the plurality of rearranged zoom levels.

Referring to FIG. 12B, the processor may detect a swipe for movement to the right (or right movement) b1 in the zoom control region 1227, and determine a zoom level selected by the swipe for the right movement b1 from among the plurality of zoom levels of the zoom bar 1227a.

Figure 12D:
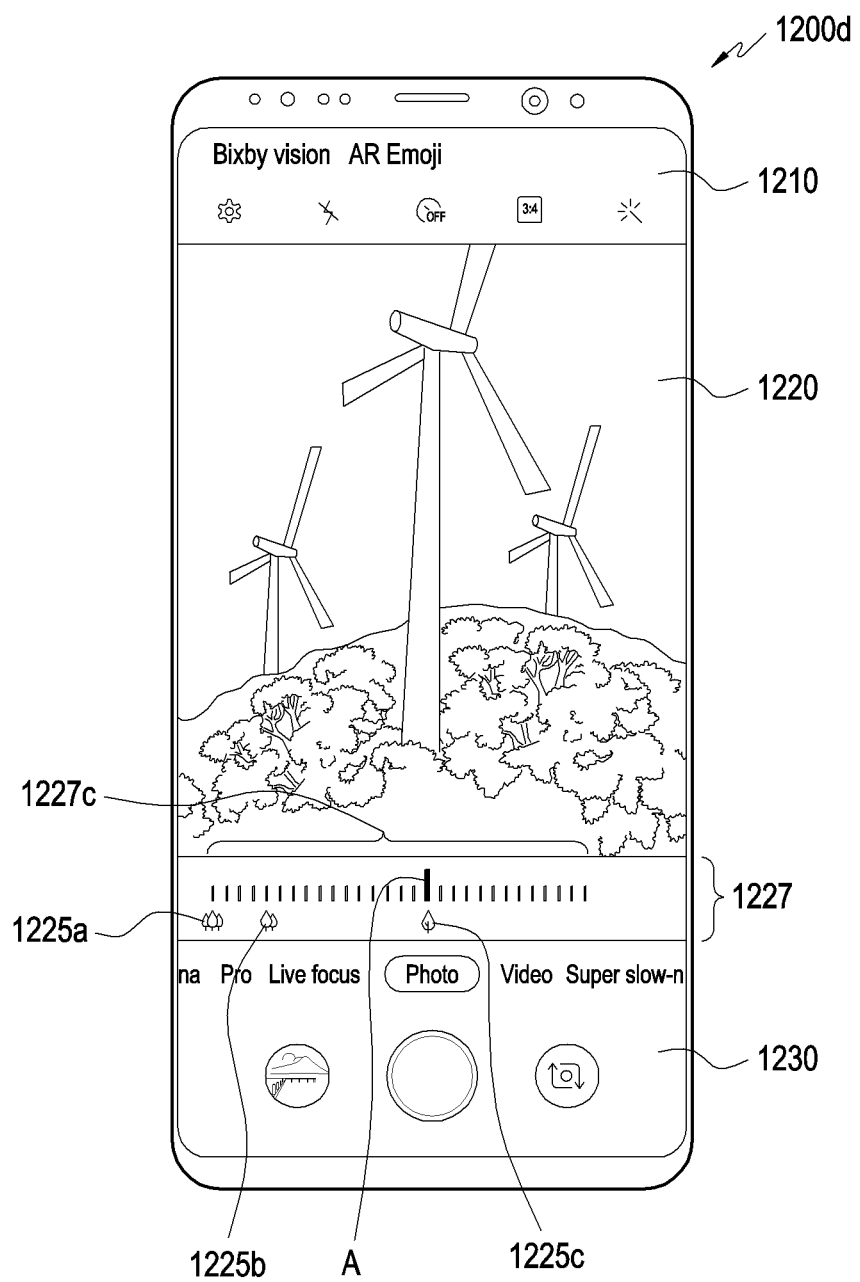

When determining the zoom level (e.g., a magnification of ×2.0) of the third lens (e.g., a tele lens) corresponding to the third icon 1225c by a swipe for the left movement b1 in FIG. 12B, the processor may display a zoom bar 1227c including a plurality of zoom levels having the first icon 1225c as the reference zoom level A in the zoom control region 1227 as shown in FIG. 12D. The processor may rearrange the plurality of zoom levels based on the third icon 1225c as the reference zoom level A is changed into the third icon 1225c, and rearrange and display the plurality of icons 1225a, 1225b, and 1225c based on the second position information changed based on the plurality of rearranged zoom levels.

Although the description has been made with reference to FIGS. 12B through 12D by using the swipe as an example of the third gesture, the third gesture may also include selecting a desired icon from among a plurality of icons corresponding to a plurality of lenses displayed in a zoom control region. Upon selection of the first icon 1225a from among the plurality of icons 1225a, 1225b, and 1225c in the zoom control region 1227 of FIG. 12B, the processor may display the zoom bar 1227b as shown in FIG. 12C. Upon selection of the third icon 1225c from among the plurality of icons 1225a, 1225b, and 1225c in the zoom control region 1227 of FIG. 12B, the processor may display the zoom bar 1227c as shown in FIG. 12D.

FIGS. 13A to 13E are views 1300a through 1300e for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Figure 13A:
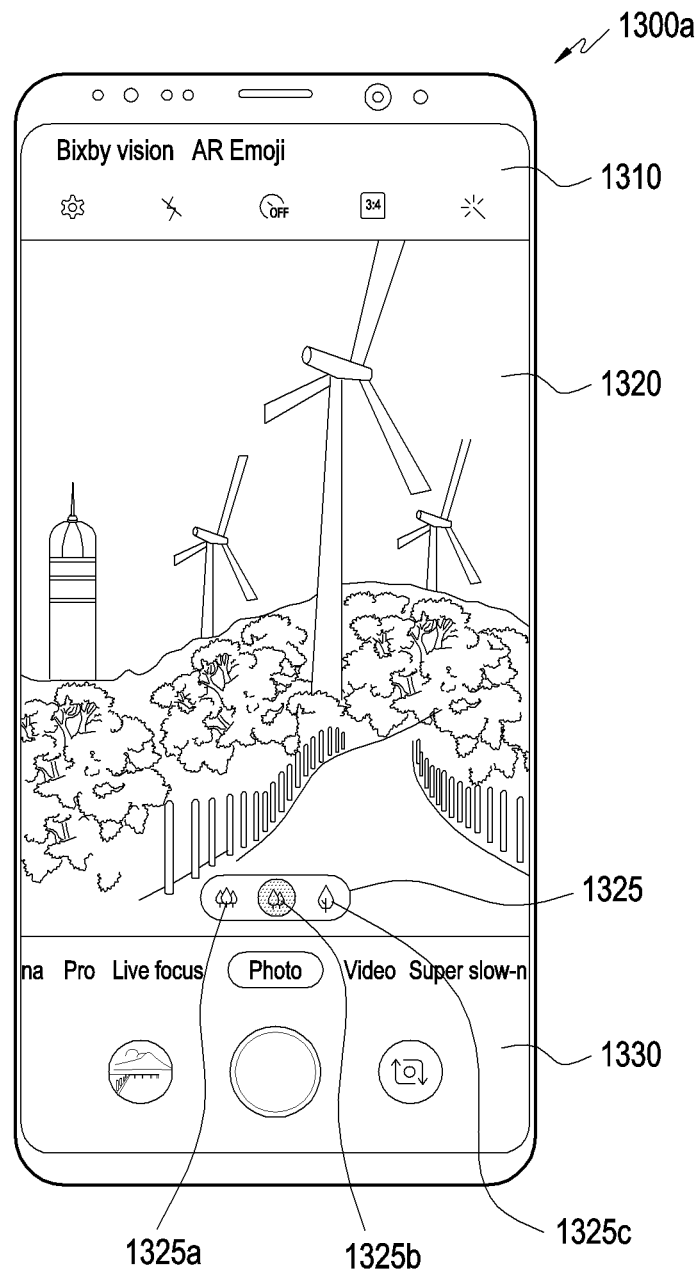
FIGS. 13A, 13B, 13C, 13D and 13E are views for describing an operation of controlling an image in an electronic device, according to various embodiments of the disclosure.
Figure 13B:
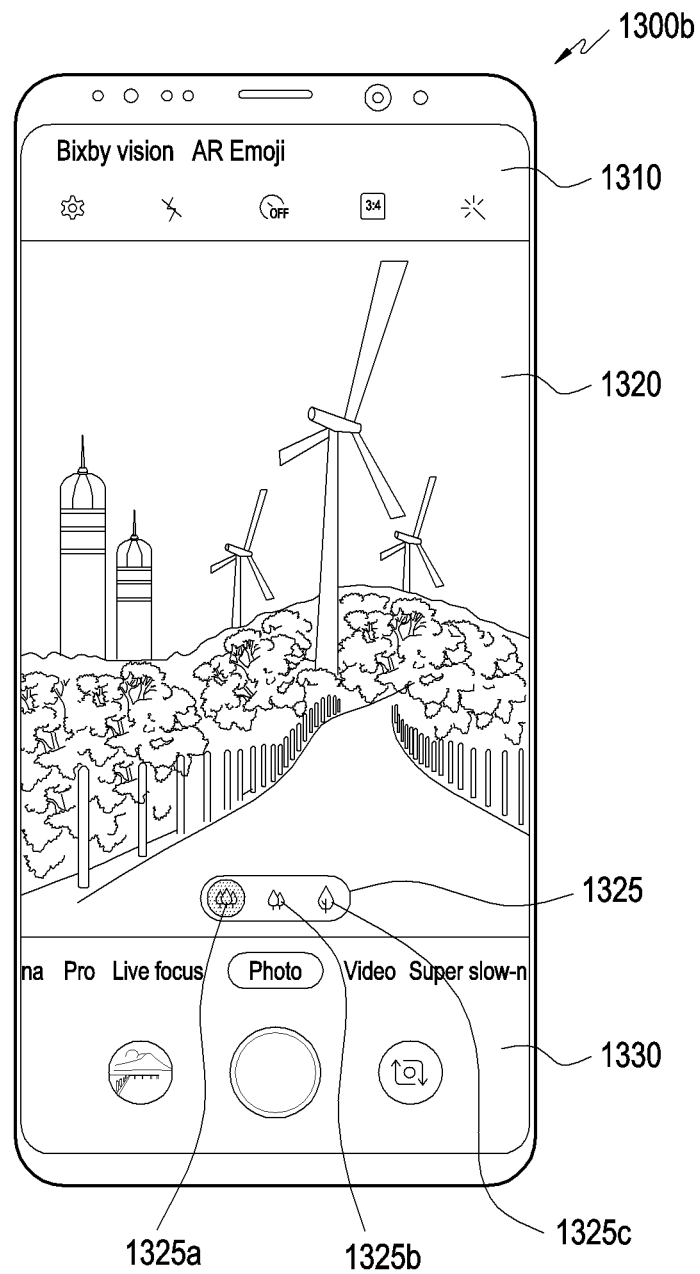
Figure 13C:
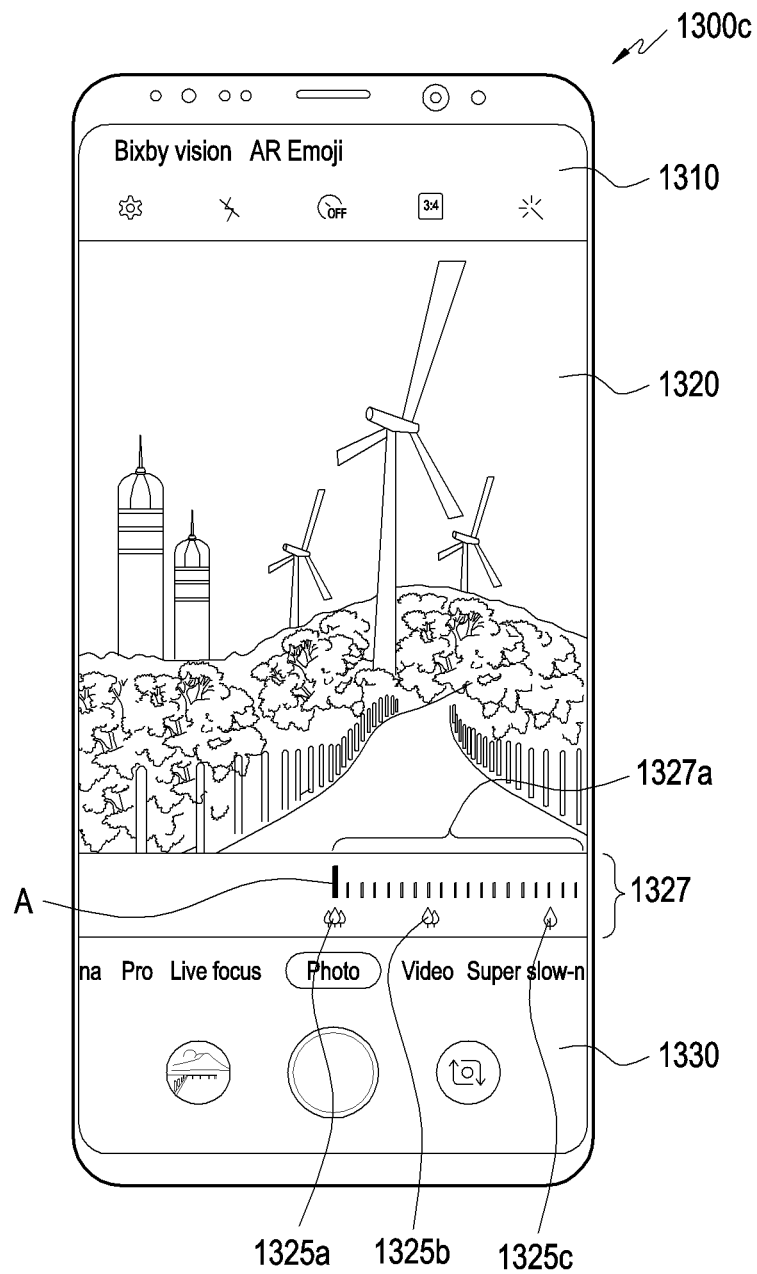

Referring to FIG. 13A, upon switchover to a first photographing mode in response to selection of an icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 1310 through 1330 to display icons indicating various functions to be performed with respect to images obtained in the first photographing mode, on the first screen 1310, and icons indicating various shooting functions and an icon indicating a shooting button on the third screen 1330. The processor may display an image received through a camera (e.g., the camera module 180 of FIGS. 1 and 2 or the camera 310 of FIG. 3) on a second screen 1320, and display a first icon 1325a corresponding to a first lens (e.g., an ultra lens) included in the camera, a second icon 1325b corresponding to a second lens (e.g., a standard lens) included in the camera, and a third icon 1325c corresponding to a third lens (e.g., a tele lens) included in the camera, in a specific region 1325 of the second screen 1320. Referring to FIG. 13A, the processor may display on the second screen 1320, an image reduced at a zoom level (e.g., a magnification of ×1.0) of the second lens (e.g., a standard lens) corresponding to the second icon 1325b set by default among the three icons 1325a, 1325b, and 1325c corresponding to the three lenses. Upon selection of the first icon 1325a among the three icons 1325a, 1325b, and 1325c displayed in the specific region 1325 by a first gesture (e.g., a tap) in FIG. 13A, the processor may obtain and display an image reduced at a zoom level (e.g., a magnification of ×0.5) of the first lens (e.g., an ultra lens) corresponding to the first icon 1325a on the second screen 1320 as shown in FIG. 13B. The processor may differently display the first icon 1325a selected by the first gesture among the three icons 1325a, 1325b, and 1325c displayed in the specific region 1325. Upon selection of any one of the first icon 1325a, the second icon 1325b, or the third icon 1325c by a second gesture (e.g., a swipe) in the first photographing mode after selection of the first lens (e.g., an ultra lens) corresponding to the first icon 1325a by the first gesture in the first photographing mode in FIG. 13B, the processor (e.g., the processor 120 of FIG. 1 or the processor 320 of FIG. 3) may switch to a second photographing mode to display zoom control region 1327 comprising a zoom bar 1327a including a plurality of zoom levels having a zoom level (e.g., ×0.5) of the first lens (e.g., an ultra lens) corresponding to the first icon 1325a as a reference zoom level A and the plurality of icons 1325a, 1325b, and 1325c rearranged in position based on the second position information corresponding to the plurality of zoom levels, as shown in FIG. 13C.

Figure 13D:
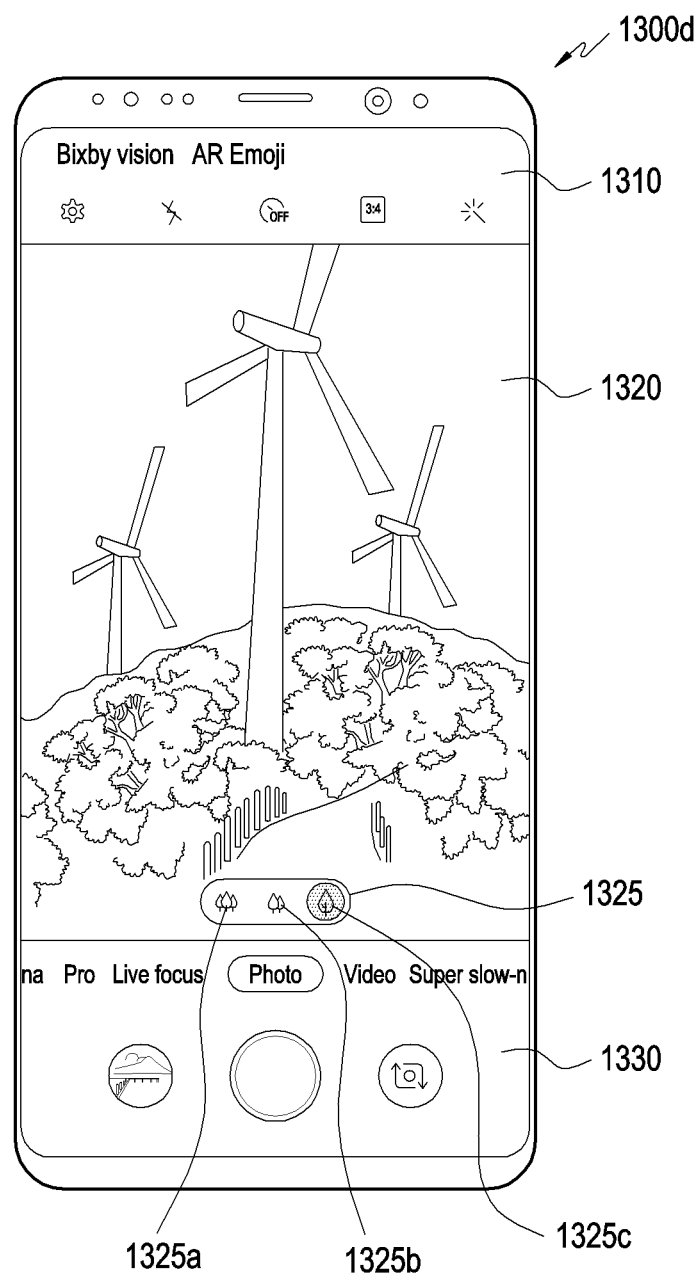
Figure 13E:
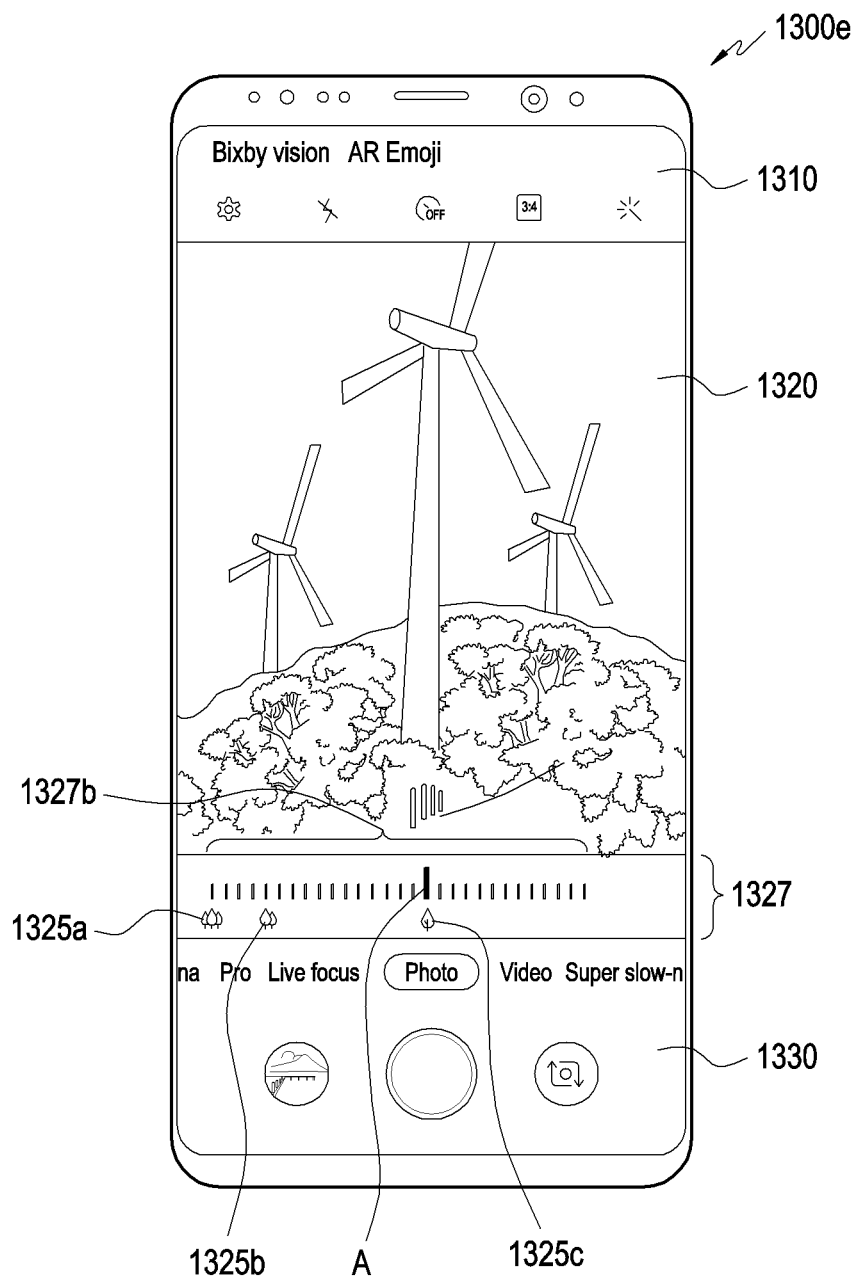

Upon selection of the third icon 1325c among the three icons 1325a, 1325b, and 1325c displayed in the specific region 1325 by the first gesture (e.g., a tap) in FIG. 13A, the processor may obtain and display an image enlarged at a zoom level (e.g., ×2.0) of the third lens (e.g., a tele lens) corresponding to the third icon 1325c on the second screen 1320 as shown in FIG. 13D. The processor may differently display the third icon 1325c selected by the first gesture among the three icons 1325a, 1325b, and 1325c displayed in the specific region 1325. Upon selection of any one of the first icon 1325a, the second icon 1325b, or the third icon 1325c by the second gesture (e.g., a swipe) in the first photographing mode after selection of the third lens (e.g., a tele lens) corresponding to the third icon 1325c by the first gesture in the first photographing mode in FIG. 13D, the processor (e.g., the processor 120 of FIG. 1 or the processor 320 of FIG. 3) may switch to a second photographing mode to display the zoom control region 1327 comprising a zoom bar 1327b including a plurality of zoom levels having a zoom level (e.g., ×2.0) of the third lens (e.g., a tele lens) corresponding to the third icon 1325c as a reference zoom level A and the plurality of icons 1325a, 1325b, and 1325c rearranged in position based on the second position information corresponding to the plurality of zoom levels, as shown in FIG. 13E.

FIGS. 14A, 14B, 15A, 15B, and 15C are views 1400a, 1400b, 1500a, 1500b, and 1500c for describing an operation of controlling a plurality of icons with respect to a structure of a lens in an electronic device, according to various embodiments of the disclosure. A plural-icon control operation may be performed by at least one of an electronic device (e.g., 101 of FIG. 1 or 301 of FIG. 3) or at least one processor (e.g., the processor 120 of FIG. 1 or 320 of FIG. 3).

Figure 14A:
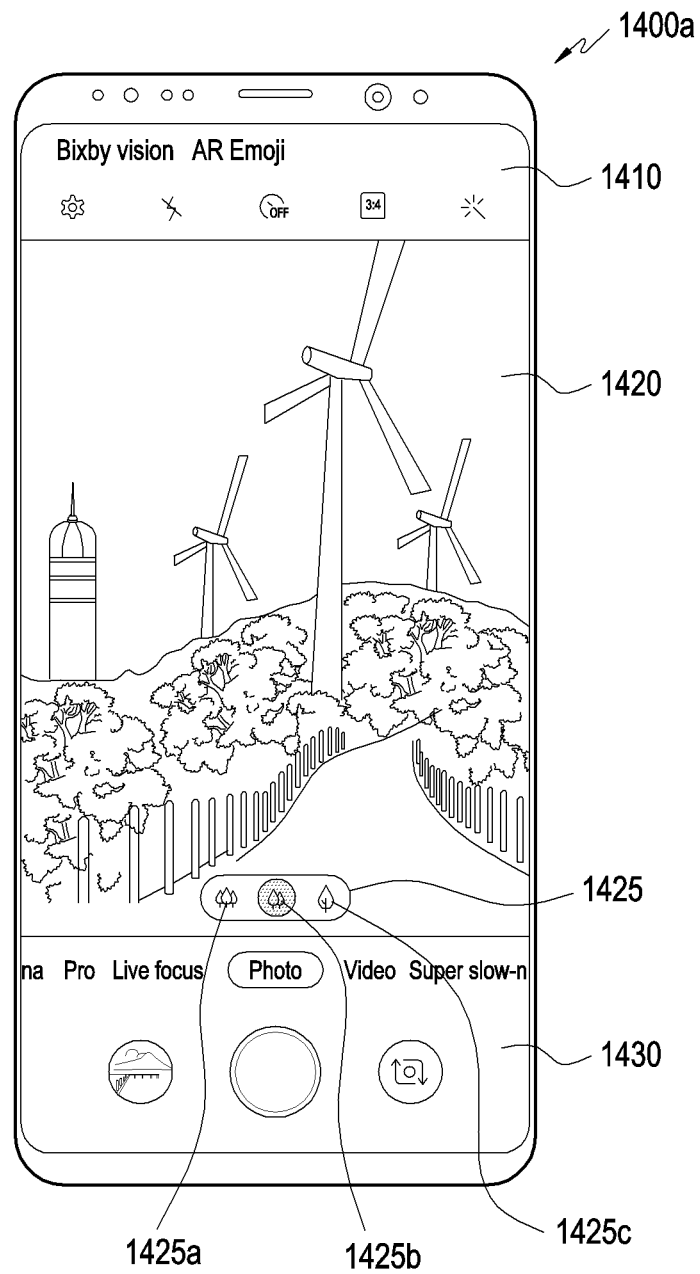
FIGS. 14A, 14B, 15A, 15B and 15C are views for describing an operation of controlling a plurality of icons with respect to a structure of a lens in an electronic device, according to various embodiments of the disclosure.
Figure 14B:
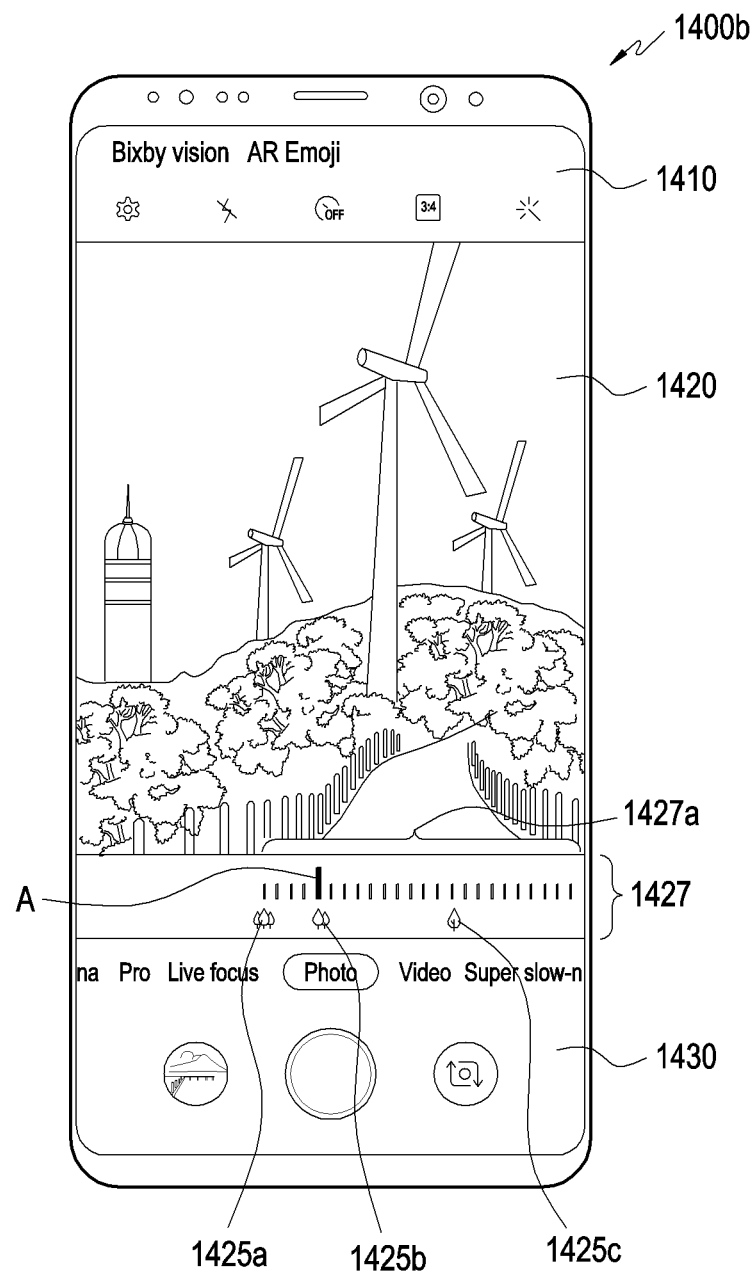

Referring to FIG. 14A, view 1400a includes a first screen 1410, a second screen 1420, and a third screen 1430. Upon switching to a first photographing mode in response to selection of an icon corresponding to a camera application, the processor (e.g., the processor 120 of FIG. 1 or the processor 320 of FIG. 3) may display three displays 1425a, 1425b, and 1425c in a specific region 1425 of a display (e.g., the display 160 of FIG. 1 or the display 360 of FIG. 3). Upon selection of any one of the three icons 1425a, 1425b, and 1425c by the second gesture (e.g., a long tab) after selection of the second icon 1425b from among the three icons 1425a, 1425b, and 1425c by a first gesture (e.g., a tap) or setting of the second icon 1425b by default in FIG. 14A, the processor (e.g., the processor 120 of FIG. 1 or the processor 320 of FIG. 3) may switch to a second photographing mode as shown in FIG. 14B. In FIG. 14B, the processor may display a zoom control region 1427 comprising a zoom bar 1427a including a plurality of zoom levels having a zoom level (e.g., ×1.5) of the second lens (e.g., a standard lens) corresponding to the second icon 1425b as a reference zoom level A and the plurality of icons 1425a, 1425b, and 1425c rearranged in position based on the second position information corresponding to the plurality of zoom levels, in the second photographing mode.

Arrangement intervals among the three icons 1425a, 1425b, and 1425c displayed around corresponding zoom levels among the plurality of zoom levels in the zoom control region 1427 may be changed according to a focal length of each of the three lenses corresponding to the three icons 1425a, 1425b, and 1425c. For example, in FIGS. 14A and 14B, when a focal length of the first lens corresponding to the first icon 1425a is 16 mm, a focal length of the second lens corresponding to the second icon 1425b is 50 mm, and a focal length of the third lens corresponding to the third icon 1425c is 80 mm, all of the three icons 1425a, 1425b, and 1425c may be displayed in the zoom control region 1427 by narrowing the arrangement intervals of the three icons 1425a, 1425b, and 1425c displayed in the corresponding zoom levels among the plurality of zoom levels in the zoom control region 1427.

Figure 15A:
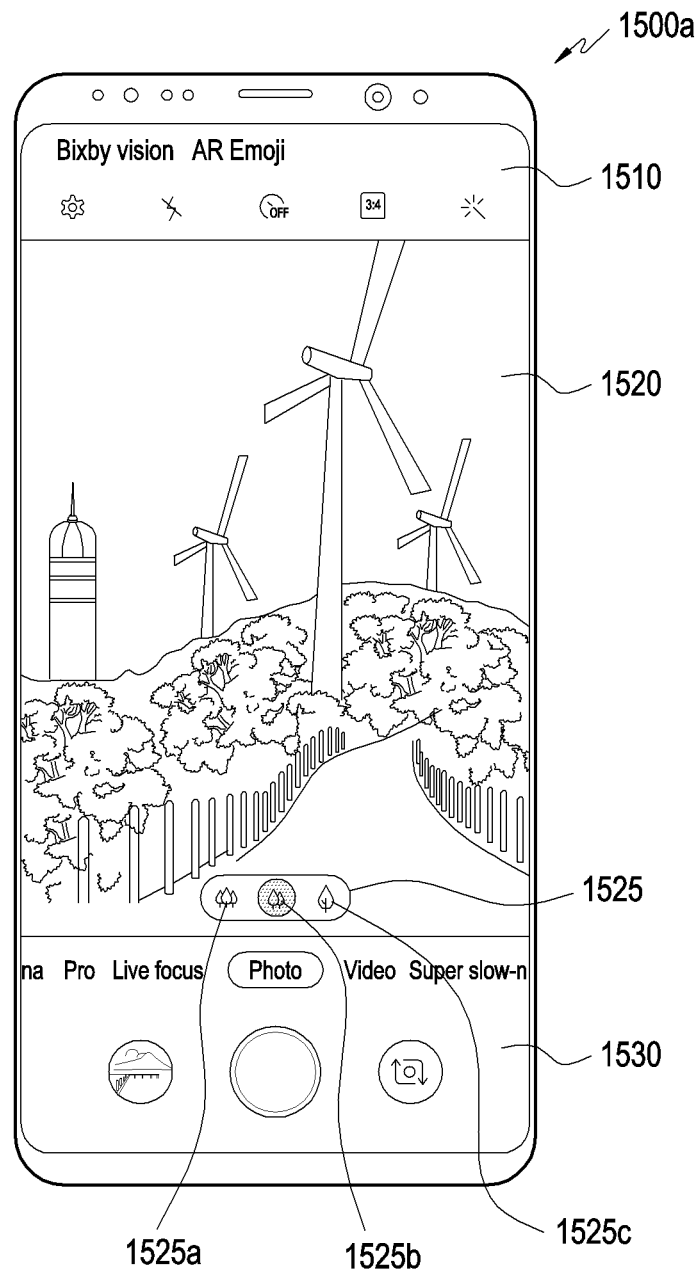
Figure 15B:
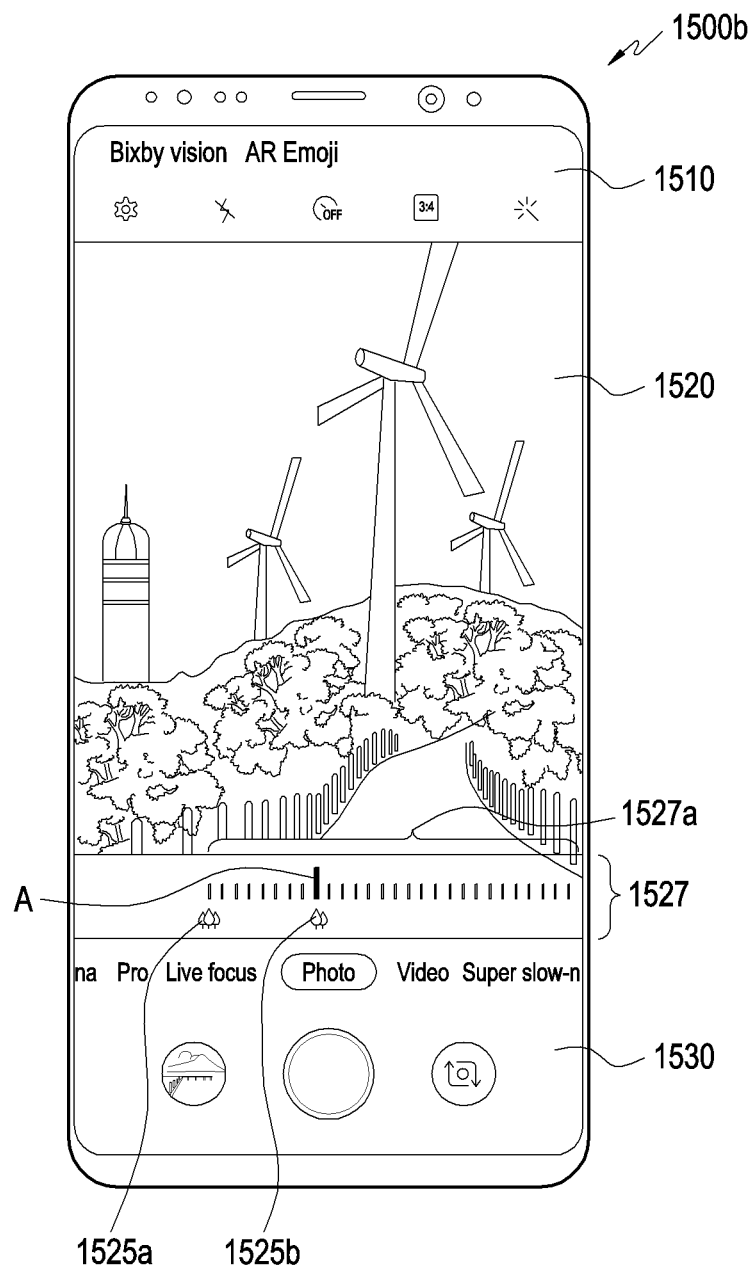

Referring to FIG. 15A, view 1500a includes a first screen 1510, a second screen 1520, and a third screen 1530. Upon switching to a first photographing mode in response to selection of an icon corresponding to a camera application, the processor (e.g., the processor 120 of FIG. 1 or the processor 320 of FIG. 3) may display three displays 1525a, 1525b, and 1525c in a specific region 1525 of a display (e.g., the display 160 of FIG. 1 or the display 360 of FIG. 3). Upon selection of any one of the three icons 1525a, 1525b, and 1525c by a second gesture (e.g., a long tab) after selection of the second icon 1525b from among the three icons 1525a, 1525b, and 1525c by a first gesture (e.g., a tap) or setting of the second icon 1425b by default in FIG. 15A, the processor (e.g., the processor 120 of FIG. 1 or the processor 320 of FIG. 3) may switch to a second photographing mode as shown in FIG. 15B. In FIG. 15B, the processor may display a zoom control region 1527 comprising a zoom bar 1527a including a plurality of zoom levels having a zoom level (e.g., ×1.5) of the second lens (e.g., a standard lens) corresponding to the second icon 1525b as a reference zoom level A and the plurality of icons 1525a, 1525b, and 1525c rearranged in position based on the second position information corresponding to the plurality of zoom levels, in the second photographing mode.

Figure 15C:
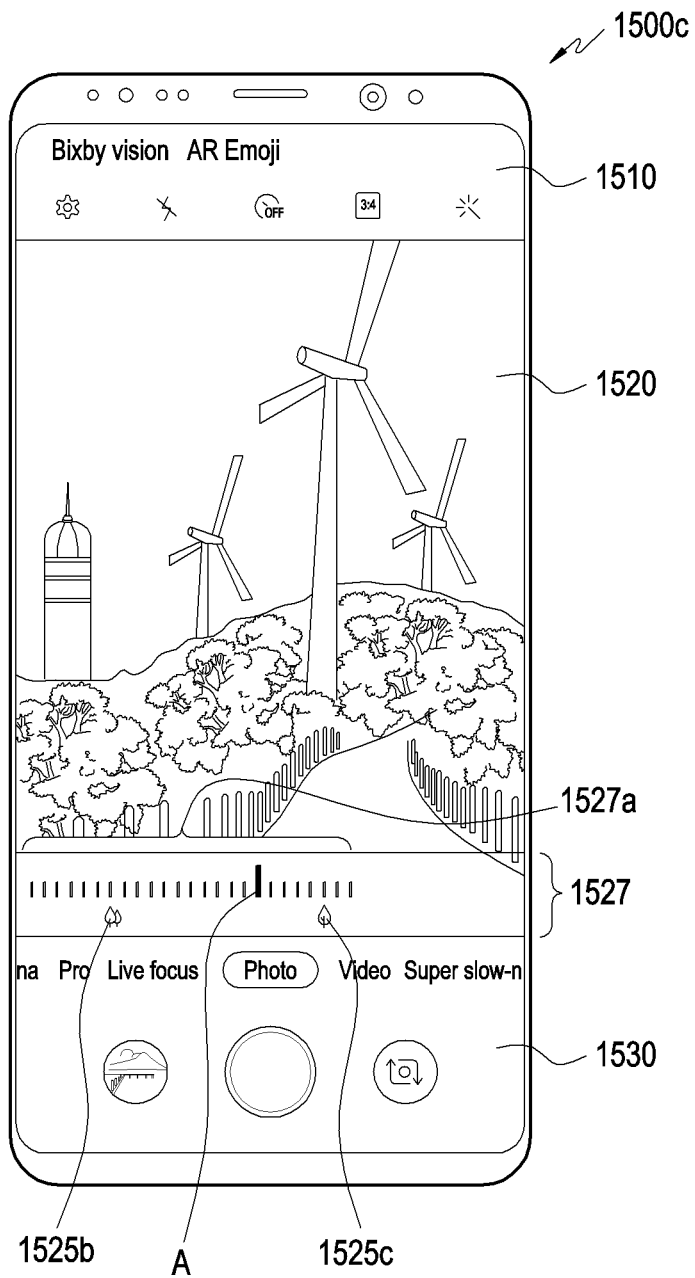

Arrangement intervals among the three icons 1525a, 1525b, and 1525c displayed around corresponding zoom levels among the plurality of zoom levels in the zoom control region 1527 may be changed according to a focal length of each of the three lenses corresponding to the three icons 1525a, 1525b, and 1525c. For example, in FIGS. 15A through 15C, when a focal length of the first lens corresponding to the first icon 1525a is 18 mm, a focal length of the second lens corresponding to the second icon 1525b is 70 mm, and a focal length of the third lens corresponding to the third icon 1525c is 300 mm, the processor may display the first icon 1525a and the second icon 1525b out of the three icons 1525a, 1525b, and 1525c in the zoom control region 1527 by widening the arrangement intervals of the three icons 1525a, 1525b, and 1525c displayed in the corresponding zoom levels among the plurality of zoom levels. Upon occurrence of a swipe as the third gesture to move to the left in the zoom control region 1527 in FIG. 15B, the third icon 1525c among the three icons 1525a, 1525b, and 1525c may be displayed as shown in FIG. 15C.

Figure 16:
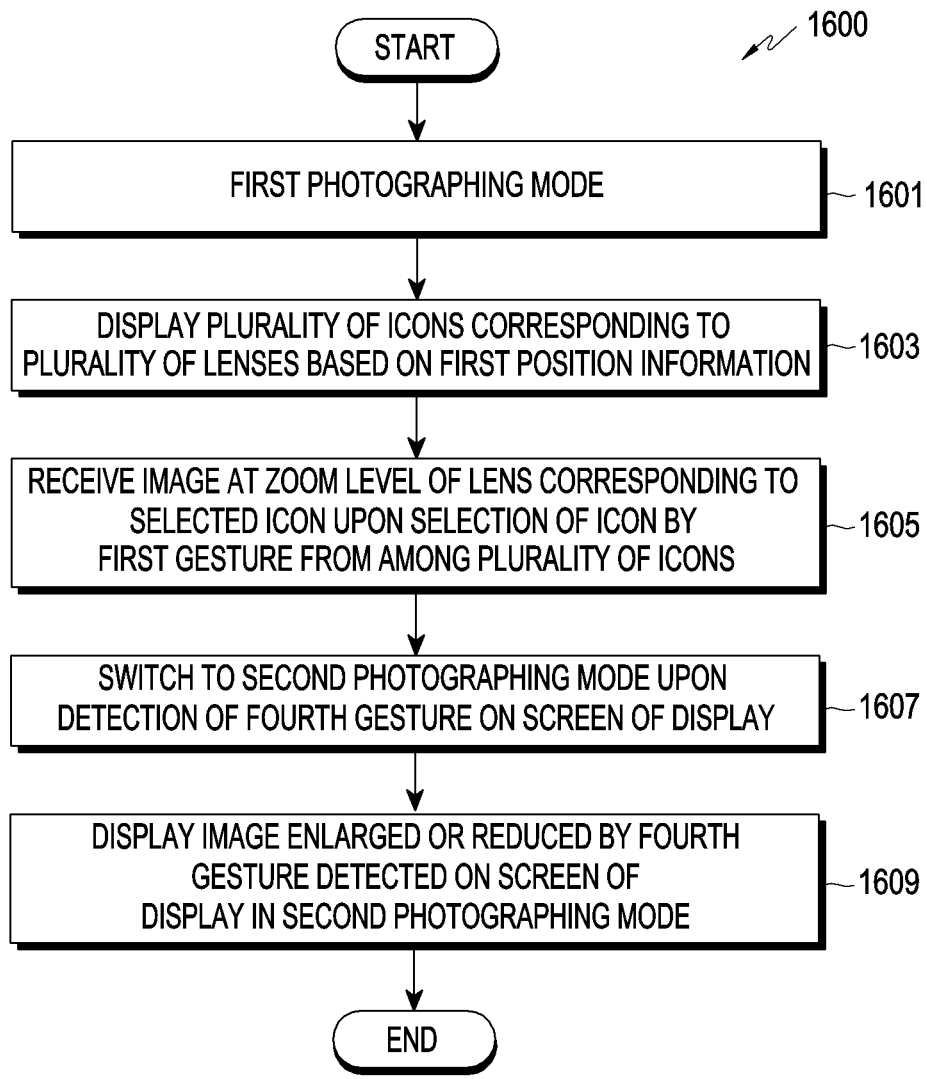
FIG. 16 is a flowchart for describing an operation of controlling an image in an electronic device, according to an embodiment of the disclosure.

FIG. 16 is a flowchart 1600 for describing an operation of controlling an image in an electronic device, according to an embodiment of the disclosure. An image control method may include operations 1601 through 1609. The image control method may be performed by at least one of an electronic device (e.g., 101 of FIG. 1 or 301 of FIG. 3) or at least one processor (e.g., the processor 120 of FIG. 1 or 320 of FIG. 3).

Referring to FIG. 16, in operation 1601, the processor (e.g., the processor 120 of FIG. 1 or the processor 320 of FIG. 3) may switch to a first photographing mode in response to selection of an icon corresponding to a camera application.

In operation 1603, in response to switchover to a first photographing mode, the processor (e.g., the processor 120 of FIG. 1 or the processor 320 of FIG. 1) may display a plurality of icons corresponding to a plurality of lenses included in a camera (e.g., the camera module 180 of FIGS. 1 and 2 or the camera 310 of FIG. 3) on the display (the display 160 of FIG. 1 or the display 360 of FIG. 3) based on first position information. The first position information is information for displaying the plurality of icons in the first photographing mode, and based on the first position information, the plurality of icons may be displayed arranged at equal intervals.

In operation 1605, the processor (e.g., the processor 120 of FIG. 1 or the processor 320 of FIG. 3) may detect selection of an icon by a first gesture (e.g., a tap or a swipe) from among the plurality of icons displayed based on the first position information in the first photographing mode. The processor may select a lens corresponding to the icon selected by the first gesture among a plurality of lenses included in a camera (e.g., the camera module 180 of FIGS. 1 and 2 or the camera 310 of FIG. 3) and obtain and display an image at a zoom level of the lens.

In operation 1607, the processor (e.g., the processor 120 of FIG. 1 or the processor 320 of FIG. 3) may switch to a second photographing mode upon detection of a fourth gesture (e.g., a pinch-in/out) on the screen of the display (e.g., the display 160 of FIG. 1 or the display 360 of FIG. 3). The processor may display a zoom control region comprising a zoom bar including a plurality of zoom levels having a zoom level of a lens corresponding to an icon selected by the first gesture as a reference zoom level and the plurality of icons rearranged in position based on the second position information corresponding to the plurality of zoom levels, in the second photographing mode.

In operation 1609, upon detection of the fourth gesture (e.g., a pinch-in/out) on the screen of the display, the processor (e.g., the processor 120 of FIG. 1 or the processor 320 of FIG. 3) may obtain an image enlarged or reduced at a zoom level of a lens corresponding to a zoom level selected by the fourth gesture from among the plurality of zoom levels and display the obtained image in the display (e.g., the display 160 of FIG. 1 or the display 360 of FIG. 3).

FIGS. 17A to 17D are views 1700a through 1700d for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Figure 17A:
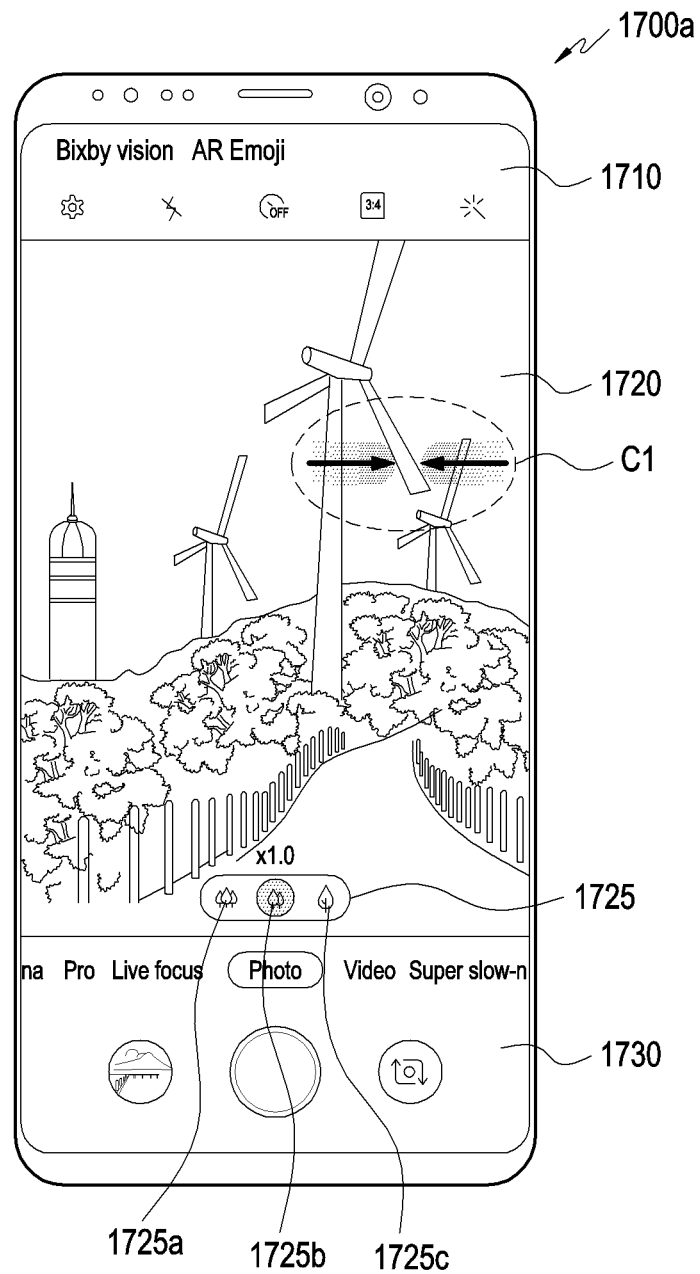
FIGS. 17A, 17B, 17C and 17D are views for describing an operation of controlling an image in an electronic device, according to various embodiments of the disclosure.

Referring to FIG. 17A, upon switchover to a first photographing mode in response to selection of an icon corresponding to a camera application, a processor (e.g., the processor 120 of FIG. 1 or the processor 320 of FIG. 3) may divide a display (e.g., the display 160 of FIG. 1 or the display 360 of FIG. 3) into first through third screens 1710 through 1730 to display icons indicating various functions to be performed with respect to images obtained in the first photographing mode, on the first screen 1710, and icons indicating various shooting functions and an icon indicating a shooting button on the third screen 1730. The processor may display an image received through a camera (e.g., the camera module 180 of FIGS. 1 and 2 or the camera 310 of FIG. 3) on a second screen 1720, and display a first icon 1725a corresponding to a first lens (e.g., an ultra lens) included in the camera, a second icon 1725b corresponding to a second lens (e.g., a standard lens) included in the camera, and a third icon 1725c corresponding to a third lens (e.g., a tele lens) included in the camera, in a specific region 1725 of the second screen 1720. Referring to FIG. 17A, the processor may display on the second screen 1320, an image reduced at a zoom level (e.g., a magnification of ×1.0) of the second lens (e.g., a standard lens) corresponding to the second icon 1725b set by default among the three icons 1725a, 1725b, and 1725c corresponding to the three lenses. Upon occurrence of, for example, a pinch-zoom c1 as the fourth gesture on the second screen 1720 while displaying three icons 1725a, 1725b, and 1725c in a specific region 1725, the processor (e.g., the processor 120 of FIG. 1 or the processor 320 of FIG. 3) may switch to a second photographing mode to display a zoom control region 1727 comprising a zoom bar 1727a including a plurality of zoom levels having a zoom level (e.g., ×1.0) of the second lens (e.g., a standard lens) corresponding to the second icon 1725b as a reference zoom level A and the plurality of icons 1725a, 1725b, and 1725c rearranged in position based on the second position information corresponding to the plurality of zoom levels, as shown in FIG. 17B.

Figure 17B:
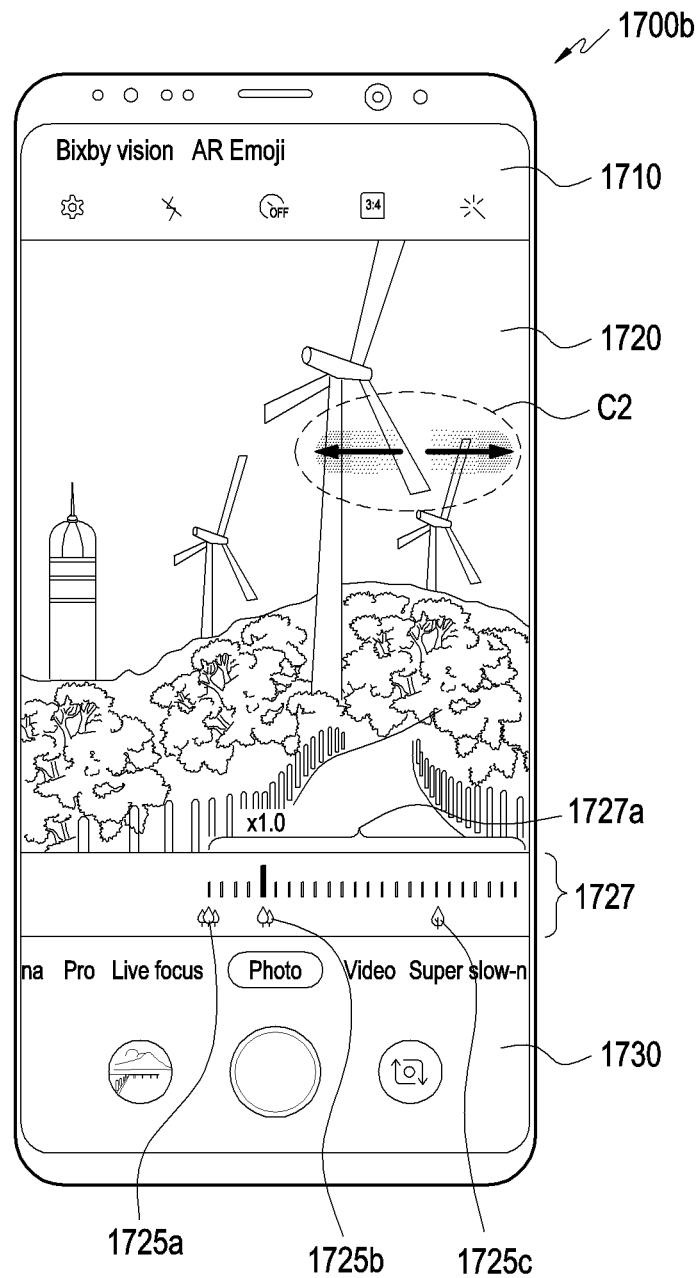
Figure 17C:
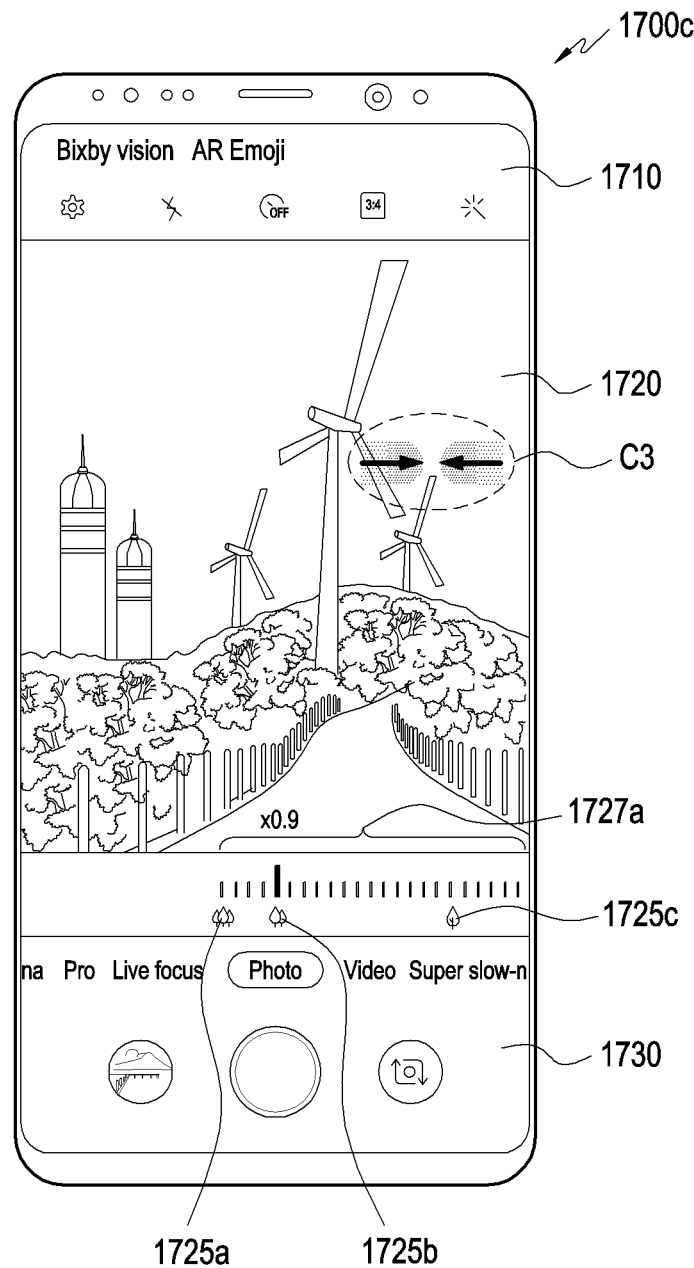

Upon detection of a pinch-zoom-out c2 on the second screen 1720 displaying an image in FIG. 17B, the processor may obtain an image reduced at a zoom level (e.g., ×0.9) of the first lens (e.g., an ultra lens) corresponding to a zoom level selected by the pinch-zoom-out c2 from among the plurality of levels and display the reduced image on the second screen 1720 as shown in FIG. 17C. The processor may change and display the plurality of zoom levels having the zoom level selected by the pinch-zoom-out c2 as the reference zoom level and rearrange the plurality of icons 1725a, 1725b, and 1725c in position based on the second position information changed according to the plurality of changed zoom levels.

Figure 17D:
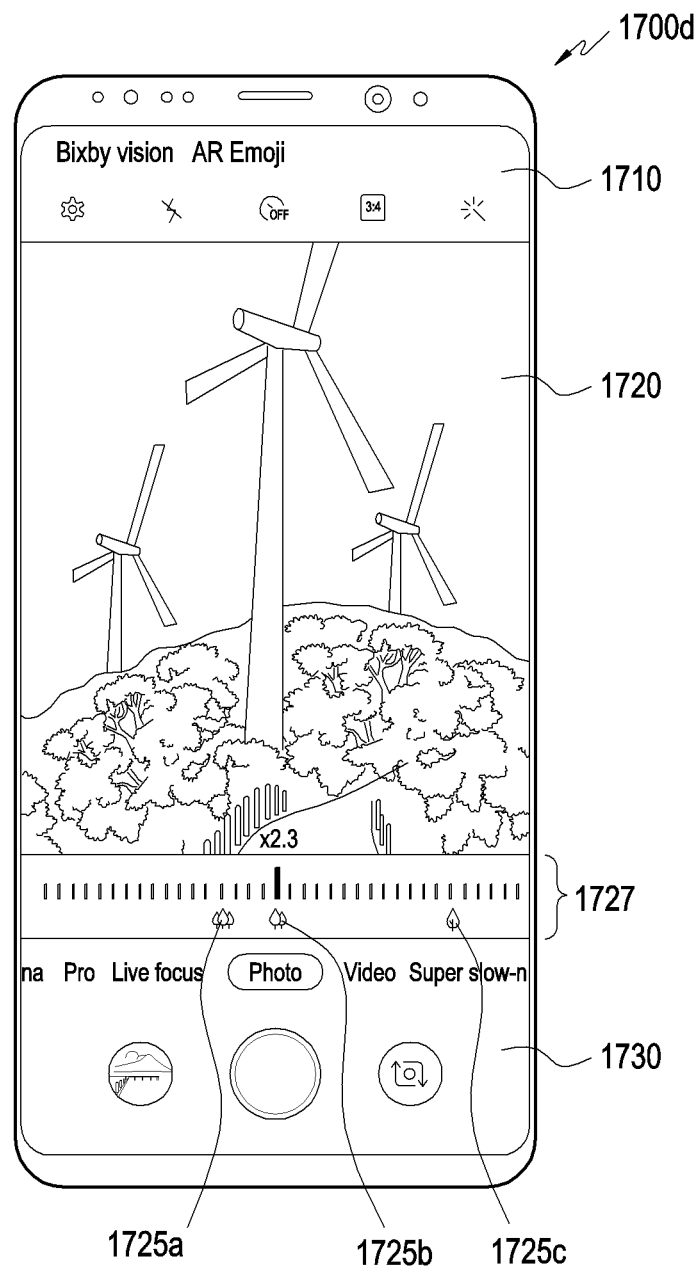

Upon detection of a pinch-zoom-in c3 on the second screen 1720 displaying an image in FIG. 17C, the processor may obtain an image enlarged at a zoom level (e.g., ×2.3) of the third lens (e.g., a tele lens) corresponding to a zoom level selected by the pinch-zoom-in c3 from among the plurality of levels and display the enlarged image on the second screen 1720 as shown in FIG. 17D. The processor may change and display the plurality of zoom levels having the zoom level selected by the pinch-zoom-in c3 as the reference zoom level and rearrange the plurality of icons 1725a, 1725b, and 1725c in position based on the second position information changed according to the plurality of changed zoom levels.

Figure 18A:
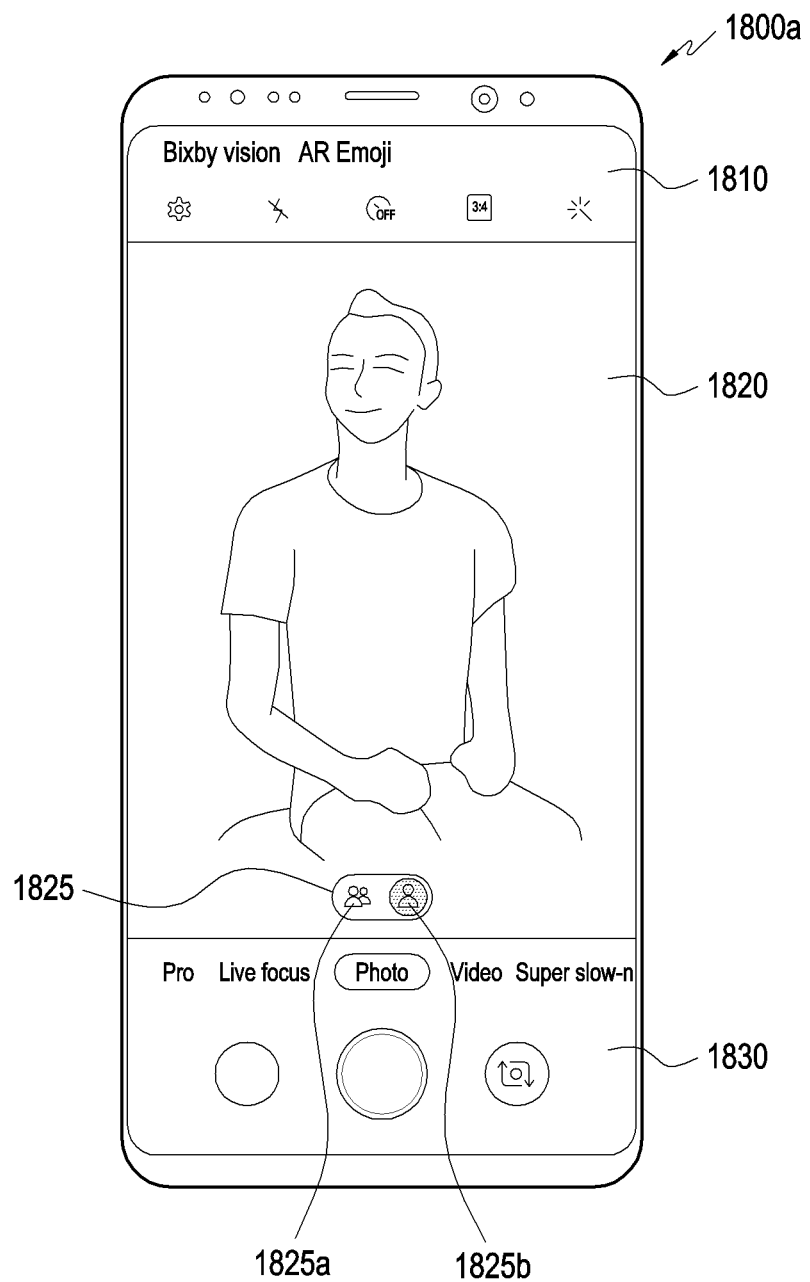
FIGS. 18A and 18B are views for describing an operation of controlling an image in an electronic device, according to various embodiments of the disclosure.
Figure 18B:
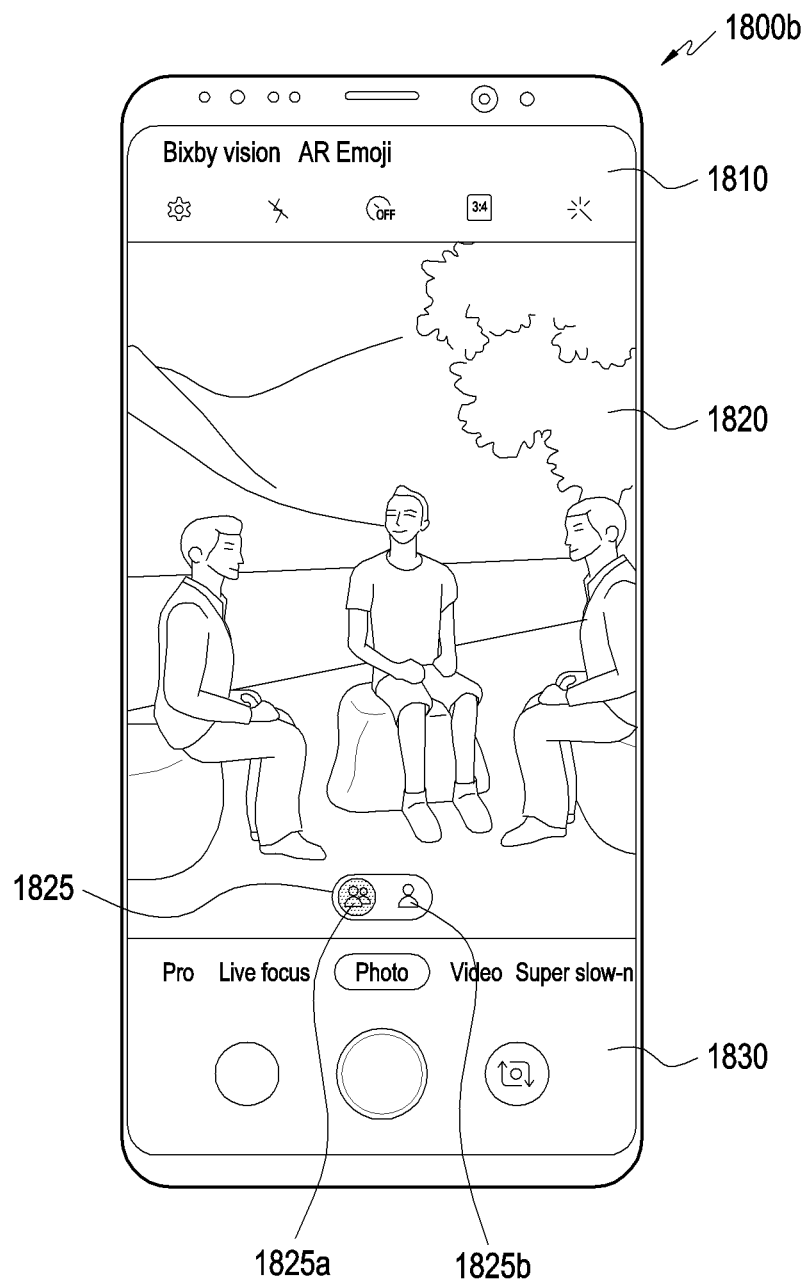

FIGS. 18A and 18B are views 1800a and 1800b for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 18A, in a first photographing mode for selfie shooting in which a user shoots while looking at a display (e.g., the display 160 of FIG. 1 or the display 360 of FIG. 3) of the electronic device, the processor (e.g., the processor 120 of FIG. 1 or the processor 320 of FIG. 3) may divide the display into first through third screens 1810 through 1830 to display icons indicating various functions to be performed with respect to images obtained in the first photographing mode, on the first screen 1810, and icons indicating various shooting functions and an icon indicating a shooting button on the third screen 1830. The processor may display an image received through the camera (e.g., the camera module 180 of FIGS. 1 and 2 or the camera 310 of FIG. 3) on the second screen 1820, and display a first icon 1825a corresponding to a first lens (e.g., a standard lens) included in the camera and a second icon 1825b corresponding to a second lens (e.g., a tele lens) included in the camera, for example, at equal intervals, based the first position information, in a specific region 1825 of the second screen 1820. Referring to FIG. 18A, upon selection of the second icon 1825b between the two icons 1825a and 1825b corresponding to the two lenses by a first gesture (e.g., a tap), the processor may display a selfie image received at a zoom level (e.g., a magnification of ×2.0) of the second lens (e.g., a tele lens) corresponding to the second icon 1825b on the second screen 1820.

Referring to FIG. 18B, upon selection of the first icon 1825a between the two icons 1825a and 1825b corresponding to the two lenses by the first gesture (e.g., a tap), the processor may display a selfie image reduced at a zoom level (e.g., a magnification of ×1.0) of the first lens (e.g., a standard lens) corresponding to the first icon 1825a on the second screen 1820.

Figure 19A:
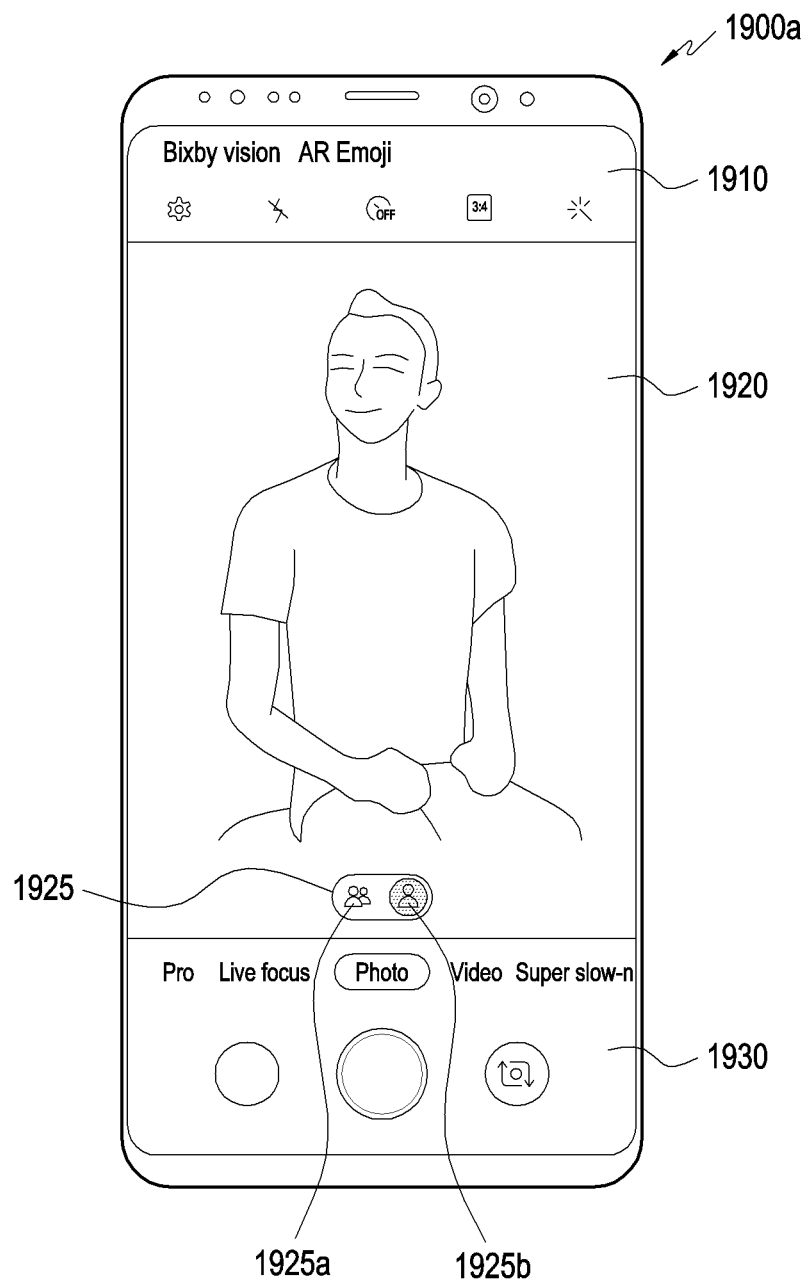
FIGS. 19A and 19B are views for describing an operation of controlling an image in an electronic device, according to various embodiments of the disclosure.
Figure 19B:
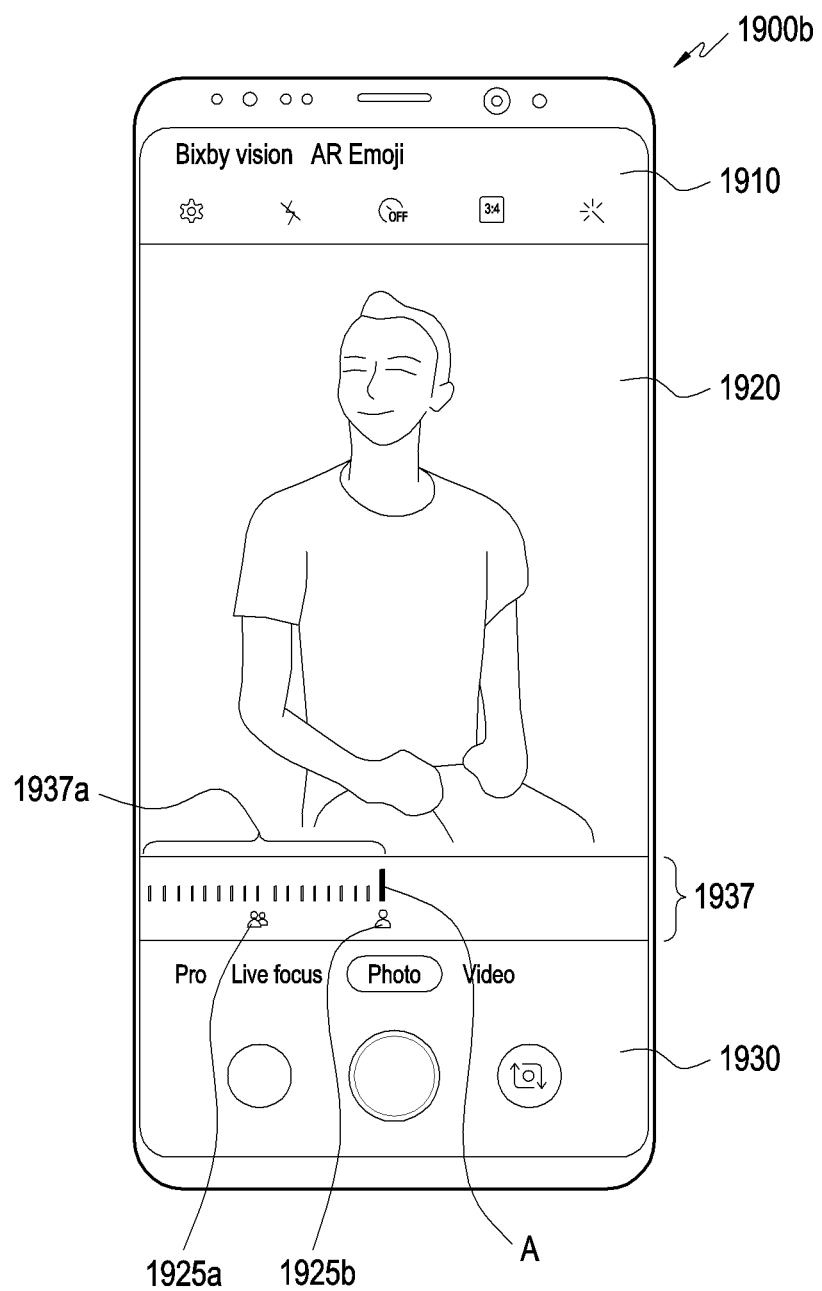

FIGS. 19A and 19B are views 1900a and 1900b for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 19A, in a first photographing mode for selfie shooting in which a user shoots while looking at a display (e.g., the display 160 of FIG. 1 or the display 360 of FIG. 3) of the electronic device, the processor (e.g., the processor 120 of FIG. 1 or the processor 320 of FIG. 3) may divide the display into first through third screens 1910 through 1930 to display icons indicating various functions to be performed with respect to images obtained in the first photographing mode, on the first screen 1910, and icons indicating various shooting functions and an icon indicating a shooting button on the third screen 1930. The processor may display an image received through the camera (e.g., the camera module 180 of FIGS. 1 and 2 or the camera 310 of FIG. 3) on the second screen 1920, and display a first icon 1925a corresponding to a first lens (e.g., a standard lens) included in the camera and a second icon 1925b corresponding to a second lens (e.g., a tele lens) included in the camera, for example, at equal intervals, based the first position information, in a specific region 1925 of the second screen 1920. Referring to FIG. 19A, upon selection of the first icon 1925a between the two icons 1925a and 1925b corresponding to the two lenses by the first gesture (e.g., a tap), the processor may display a selfie image received at a zoom level (e.g., a magnification of ×2.0) of the second lens (e.g., a tele lens) corresponding to the second icon 1925b on the second screen 1920.

Upon selection of any one of the first icon 1925a and the second icon 1925b by a second gesture (e.g., a swipe) in the first photographing mode after selection of the second lens (e.g., a tele lens) corresponding to the second icon 1925b by the first gesture in the first photographing mode in FIG. 19A, the processor (e.g., the processor 120 of FIG. 1 or the processor 320 of FIG. 2) may switch to a second photographing mode to display a zoom control region 1937 comprising a zoom bar 1937a including a plurality of zoom levels having a zoom level of a lens corresponding to the second icon 1925b as a reference zoom level A and the plurality of icons 1925a and 1925b rearranged in position based on the second position information, as shown in FIG. 19B.

Figure 20A:
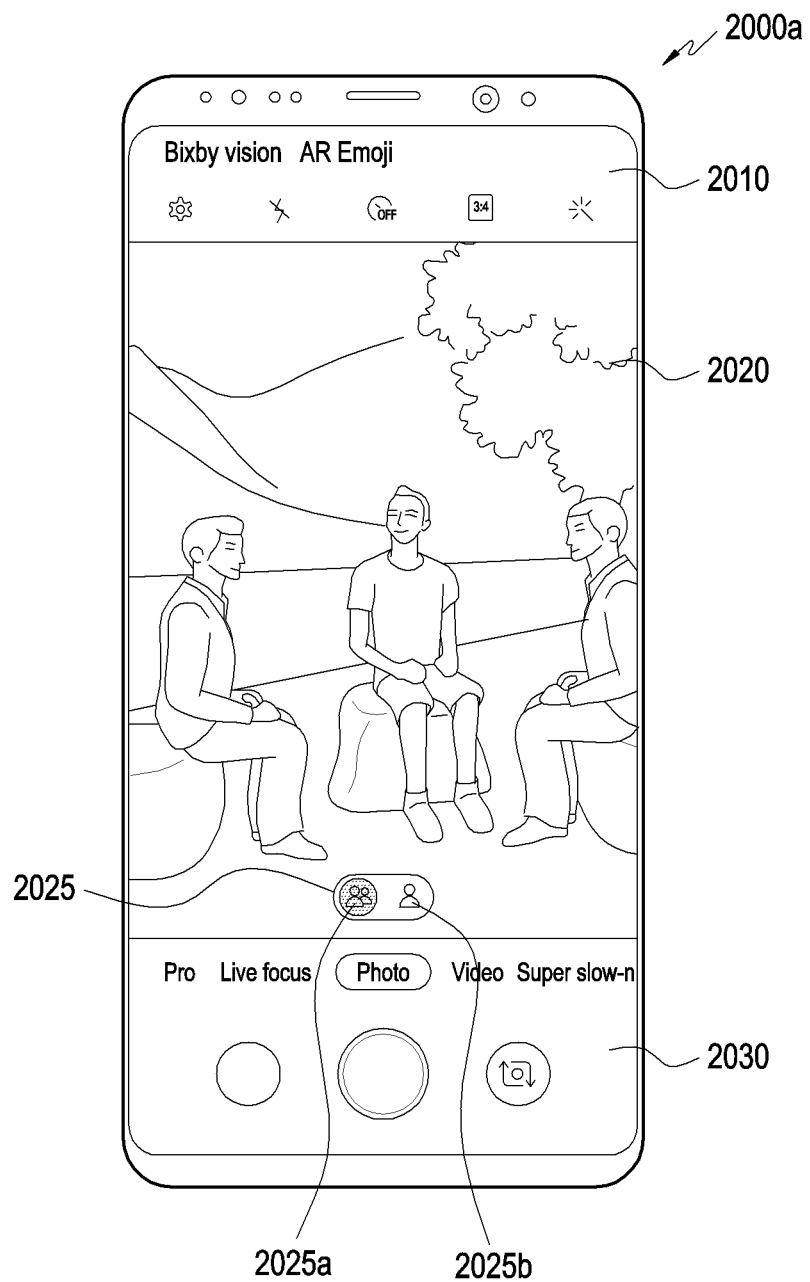
FIGS. 20A and 20B are views for describing an operation of controlling an image in an electronic device, according to various embodiments of the disclosure.
Figure 20B:
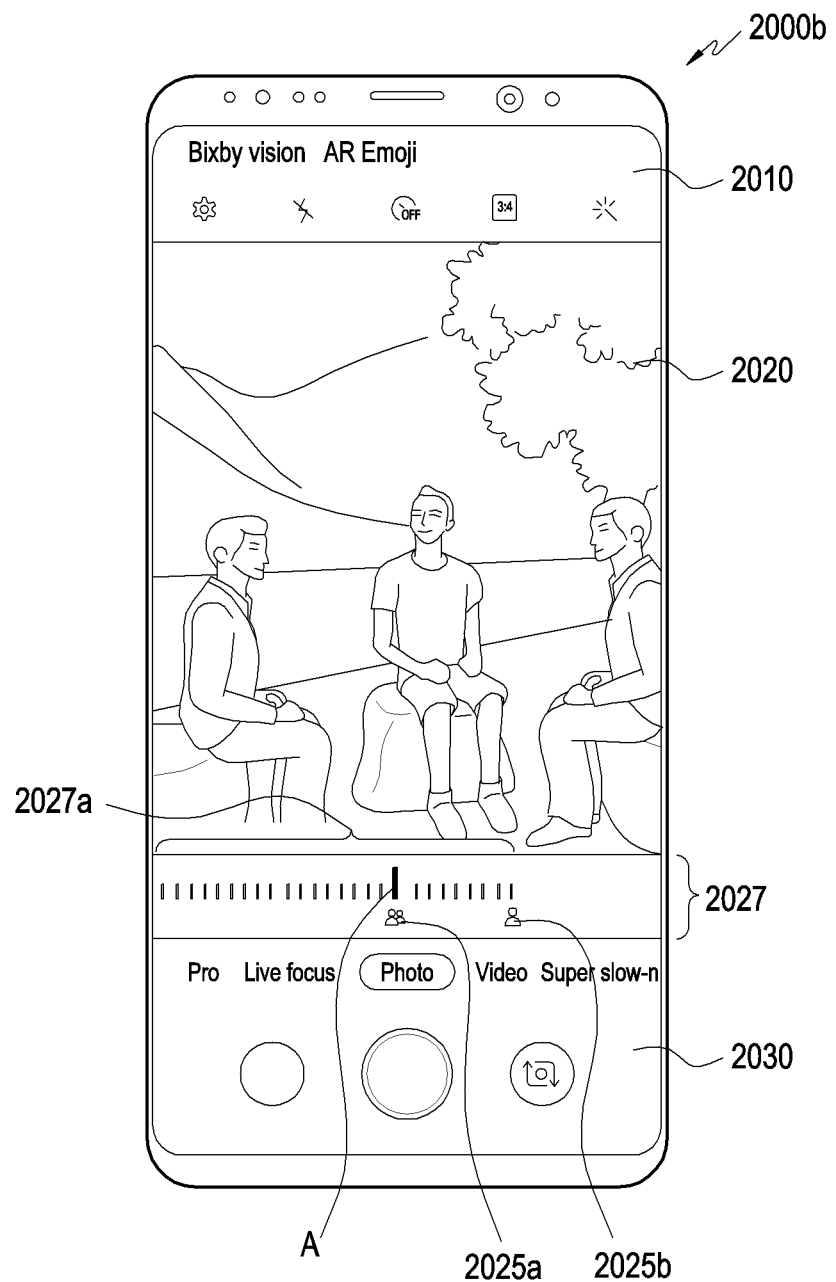

FIGS. 20A and 20B are views 2000a and 2000b for describing an operation of controlling an image in an electronic device, according to various embodiments of the disclosure. An image control operation may be performed by at least one of an electronic device (e.g., 101 of FIG. 1 or 301 of FIG. 3) or at least one processor (e.g., the processor 120 of FIG. 1 or 320 of FIG. 3).

Referring to FIG. 20A, in the first photographing mode for selfie shooting in which a user shoots while looking at a display (e.g., the display 160 of FIG. 1 or the display 360 of FIG. 3) of the electronic device, the processor (e.g., the processor 120 of FIG. 1 or the processor 320 of FIG. 3) may divide the display into first through third screens 2010 through 2030 to display icons indicating various functions to be performed with respect to images obtained in the first photographing mode, on the first screen 2010, and icons indicating various shooting functions and an icon indicating a shooting button on the third screen 2030. The processor may display an image received through the camera (e.g., the camera module 180 of FIGS. 1 and 2 or the camera 310 of FIG. 3) on the second screen 2020, and display a first icon 2025a corresponding to a first lens (e.g., a standard lens) included in the camera and a second icon 2025b corresponding to a second lens (e.g., a tele lens) included in the camera, for example, at equal intervals, based the first position information, in a specific region 2025 of the second screen 2020. Referring to FIG. 20A, upon selection of the first icon 2025a between the two icons 2025a and 2025b corresponding to the two lenses by a first gesture (e.g., a tap), the processor may display a selfie image received at a zoom level (e.g., a magnification of ×1.0) of the first lens (e.g., a standard lens) corresponding to the first icon 2025a on the second screen 2020.

Upon selection of any one of the first icon 2025a and the second icon 2025b by ae second gesture (e.g., a swipe) in the first photographing mode after selection of the first lens (e.g., a standard lens) corresponding to the first icon 2025a by the first gesture in the first photographing mode in FIG. 20A, the processor (e.g., the processor 120 of FIG. 1 or the processor 320 of FIG. 1) may switch to a second photographing mode to display a zoom control region 2027 comprising a zoom bar 2027a including a plurality of zoom levels having a zoom level of a lens corresponding to the first icon 2025a as a reference zoom level A and the plurality of icons 2025a and 2025b rearranged in position based on the second position information, as shown in FIG. 20B.

According to various embodiments, an image control method in an electronic device (e.g., the electronic device 101 of FIG. 1 or the electronic device of FIG. 2) may include displaying a plurality of icons corresponding to the plurality lenses, based on first position information in a first photographing mode and upon selection of an icon by a first gesture from among the plurality of icons in the first photographing mode, switching to a second photographing mode to display a zoom control region including a plurality of zoom levels having a zoom level of a lens corresponding to the selected icon as a reference zoom level and the plurality of icons rearranged in position based on second position information corresponding to the plurality of zoom levels.

According to various embodiments, the displaying of the plurality of icons may include arranging and displaying the plurality of icons at specific intervals based on the first position information in the first photographing mode.

According to various embodiments, the image control method may further include, upon selection of an icon by a second gesture from among the plurality of icons in the first photographing mode, displaying an image at a zoom level of a lens corresponding to the selected icon.

According to various embodiments, the displaying of the plurality of icons may include displaying the plurality of icons and differently displaying the selected icon among the plurality of icons, while displaying an image at a zoom level of a lens corresponding to an icon selected by a second gesture from among the plurality of icons.

According to various embodiments, the switching to the second photographing mode may include rearranging each of the plurality of icons in a position corresponding to a zoom level among the plurality of zoom levels based on the second position information in the second photographing mode.

According to various embodiments, the switching to the second photographing mode may include, in response to switchover to the second photographing mode, displaying the zoom control region, while displaying an image at a zoom level of a lens corresponding to the reference zoom level.

According to various embodiments, the image control method may further include, upon detection of a third gesture in the zoom control region, displaying an image at a zoom level of a lens corresponding to a zoom level selected by the third gesture from among the plurality of zoom levels.

According to various embodiments, the image control method may further include changing the zoom level selected by the third gesture to the reference zoom level among the plurality of levels.

According to various embodiments, the image control method may further include switching to the first photographing mode when the third gesture is not detected in the zoom control region until an elapse of a specific time, while displaying the zoom control region in the second photographing mode.

According to various embodiments, the image control method may further include switching to the second photographing mode to display the zoom control region upon detection of a fourth gesture on a screen of a display of the electronic device in the first photographing mode.

According to various embodiments, in a photographing mode where an image prior to photographing is displayed, image enlargement and reduction may be performed conveniently. Moreover, by displaying a user interface (UI) indicating a plurality of lenses having different zoom levels in the camera, image enlargement and reduction may be easily performed in the photographing mode.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
   a camera module configured to support a plurality of zoom levels including a first zoom level and a second zoom level greater than the first zoom level;
   a touch-sensitive display; and
   a processor configured to:
      display, via the touch-sensitive display, a camera execution screen including a preview image corresponding to the first zoom level such that a first indicator indicative of the first zoom level and a second indicator indicative of the second zoom level are displayed in the camera execution screen concurrently with the preview image corresponding to the first zoom level,
      receive a touch input with respect to the second indicator,
      if the touch input is a first type touch input with respect to the second indicator, display, via the touch-sensitive display, a camera execution screen including a preview image corresponding to the second zoom level such that the first indicator indicative of the first zoom level and the second indicator indicative of the second zoom level are displayed in the camera execution screen concurrently with the preview image corresponding to the second zoom level, and
      if the touch input is a second type touch input with respect to the second indicator, display, via the touch-sensitive display, a camera execution screen including the preview image corresponding to the first zoom level and a zoom control interface including sub zoom levels, the zoom control interface including a first scale indicator corresponding to the first zoom level, a second scale indicator corresponding to the second zoom level, and one or more third scale indicators between the first scale indicator and the second scale indicator, each of the one or more third scale indicators corresponding to a respective one of one or more sub zoom levels between the first zoom level and the second zoom level.

2. The portable communication device of claim 1, wherein the processor is further configured to:
   while the zoom control interface is displayed in the camera execution screen concurrently with the preview image corresponding to the first zoom level, receive, another touch input with respect to the zoom control interface to change the first zoom level to the second zoom level; and
   based at least in part on the other touch input being received with respect to the zoom control interface, display the second scale indicator corresponding to the second zoom level as a reference scale indicator.

3. The portable communication device of claim 1,
wherein the plurality of zoom levels includes a third zoom level greater than the second zoom level, and
wherein the processor is further configured to:
perform the displaying of a camera execution screen including the preview image corresponding to the first zoom level such that the first indicator, the second indicator and a third indicator indicative of the third zoom level are arranged at a first interval in the camera execution screen.

4. The portable communication device of claim 3, wherein the processor is further configured to:
if a second type touch input is detected in the second indicator, perform the displaying of a camera execution screen and a zoom control interface such that the first scale indicator and the second scale indicator are arranged at a second interval greater than the first interval, and the second scale indicator and a fourth scale indicator indicative of the third zoom level are arranged at a third interval greater than the first interval and the second interval in the zoom control interface.

5. The portable communication device of claim 1, wherein the processor is further configured to:
perform the displaying of the camera execution screen including the preview image corresponding to the first zoom level and the zoom control interface such that a position of a reference scale indicator is maintained at a substantially central area in the zoom control interface while a zoom level is adjusted with respect to the preview image corresponding to the first zoom level displayed in the camera execution screen.

6. The portable communication device of claim 1, wherein the processor is further configured to:
perform the displaying of the camera execution screen including the preview image corresponding to the first zoom level and the zoom control interface such that the zoom control interface is at least partially overlapped with the preview image.

7. The portable communication device of claim 1, wherein the camera module includes a first camera assembly supporting the first zoom level, and a second camera assembly supporting the second zoom level.

8. The portable communication device of claim 1, wherein the processor is further configured to:
if a second type touch input is detected in the first indicator, while displaying the camera execution screen including the preview image corresponding to the second zoom level, display, via the touch-sensitive display, a camera execution screen including a preview image corresponding to the second zoom level such that a zoom control interface is displayed in the camera execution screen concurrently with the preview image corresponding to the second zoom level, the second scale indicator corresponding to the second zoom level being displayed as a reference scale indicator.

9. The portable communication device of claim 8, wherein the processor is further configured to:
while the zoom control interface is displayed in the camera execution screen concurrently with the preview image, receive, another touch input with respect to the zoom control interface to change the second zoom level to the first zoom level; and
based at least in part on the other touch input being received with respect to the zoom control interface, display the first scale indicator as the reference scale indicator.

10. A method of an electronic device, the comprising:
displaying a camera execution screen including a preview image corresponding to a first zoom level such that a first indicator indicative of the first zoom level and a second indicator indicative of a second zoom level are displayed in the camera execution screen concurrently with the preview image corresponding to the first zoom level;
receiving a touch input with respect to the second indicator;
if the touch input is a first type touch input with respect to the second indicator, displaying, via a touch-sensitive display, a camera execution screen including a preview image corresponding to the second zoom level such that the first indicator indicative of the first zoom level and the second indicator indicative of the second zoom level are displayed in the camera execution screen concurrently with the preview image corresponding to the second zoom level; and
if the touch input is a second type touch input with respect to the second indicator, display, via the touch-sensitive display, a camera execution screen including the preview image corresponding to the first zoom level and a zoom control interface including sub zoom levels, the zoom control interface including a first scale indicator corresponding to the first zoom level, a second scale indicator corresponding to the second zoom level, and one or more third scale indicators between the first scale indicator and the second scale indicator, each of the one or more third scale indicators corresponding to a respective one of one or more sub zoom levels between the first zoom level and the second zoom level.

11. The method of claim 10, further comprising,
while the zoom control interface is displayed in the camera execution screen concurrently with the preview image corresponding to the first zoom level, receiving, another touch input with respect to the zoom control interface to change the first zoom level to the second zoom level; and
based at least in part on the other touch input being received with respect to the zoom control interface, displaying the second scale indicator corresponding to the second zoom level as a reference scale indicator.

12. The method of claim 10, further comprising,
when a plurality of zoom levels includes a third zoom level greater than the second zoom level, performing the displaying of the first camera execution screen including the preview image corresponding to the first zoom level such that the first indicator, the second indicator and a third indicator indicative of the third zoom level are arranged at a same predetermined interval in the camera execution screen.

13. The method of claim 12, further comprising,
if a second type touch input is detected in the second indicator, performing the displaying of a camera execution screen and a zoom control interface such that the first scale indicator and the second scale indicator are arranged at a third interval greater than a first interval, and the second scale indicator and a fourth scale indicator indicative of the third zoom level are arranged at a fourth interval greater than a second interval and the third interval in the zoom control interface.

14. The method of claim 11, further comprising,
performing the displaying of the camera execution screen including the preview image corresponding to the first zoom level and the zoom control interface such that a position of a reference scale indicator is maintained at a substantially central area in the zoom control interface while a zoom level is adjusted with respect to the preview image corresponding to the first zoom level displayed in the camera execution screen.

15. The method of claim 11, further comprising,
performing the displaying of the camera execution screen including the preview image corresponding to the first zoom level and the zoom control interface such that the zoom control interface is at least partially overlapped with the preview image.

16. The method of claim 11, wherein a camera module of the electronic device includes a first camera assembly supporting the first zoom level, and a camera assembly supporting the second zoom level.

17. The method of claim 11, further comprising,
if a second type touch input is detected in the first indicator, while displaying the camera execution screen including the preview image corresponding to the second zoom level, displaying a camera execution screen including first a preview image corresponding to the second zoom level such that a zoom control interface is displayed in the camera execution screen concurrently with the first preview image corresponding to the second zoom level, the second scale indicator corresponding to the second zoom level being displayed as a reference scale indicator.

18. The method of claim 17, further comprising,
while the zoom control interface is displayed in the camera execution screen concurrently with the preview image, receiving, another touch input with respect to the zoom control interface to change the second zoom level to the first zoom level; and
based at least in part on the other touch input being received with respect to the zoom control interface, displaying the first scale indicator as the reference scale indicator.

* * * * *